US012594827B2

(12) United States Patent
Shimatani

(10) Patent No.: US 12,594,827 B2
(45) Date of Patent: Apr. 7, 2026

(54) OFF-ROAD VEHICLE

(71) Applicant: KAWASAKI MOTORS, LTD., Hyogo (JP)

(72) Inventor: Kengo Shimatani, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 311 days.

(21) Appl. No.: 18/230,170

(22) Filed: Aug. 4, 2023

(65) Prior Publication Data

US 2025/0042244 A1     Feb. 6, 2025

(51) Int. Cl.
| | |
|---|---|
| *B60K 13/02* | (2006.01) |
| *B60K 13/04* | (2006.01) |
| *B62D 25/08* | (2006.01) |
| *F02M 35/02* | (2006.01) |
| *F02M 35/16* | (2006.01) |

(52) U.S. Cl.
CPC .............. *B60K 13/02* (2013.01); *B60K 13/04* (2013.01); *B62D 25/081* (2013.01); *F02M 35/0204* (2013.01); *F02M 35/162* (2013.01)

(58) Field of Classification Search
CPC ...... B60K 13/02; B60K 13/04; B62D 25/081; F02M 35/0204; F02M 35/162; F02M 35/0201; F02M 35/0203; F02M 35/02416; F02M 35/048; F02M 35/10013; F02M 35/024; F02M 35/02425; F02M 35/02475; F02M 35/02483
See application file for complete search history.

(56) References Cited

U.S. PATENT DOCUMENTS

| | | | | |
|---|---|---|---|---|
| 4,278,455 A | * | 7/1981 | Nardi ..................... | B01D 46/64 |
| | | | | 55/482 |
| 5,547,480 A | * | 8/1996 | Coulonvaux ...... | B01D 46/0046 |
| | | | | 55/498 |
| 5,730,769 A | * | 3/1998 | Dungs ................. | F02M 35/024 |
| | | | | 55/482 |
| 6,833,023 B1 | * | 12/2004 | Vandenberghe ....... | B01D 50/20 |
| | | | | 55/498 |

(Continued)

FOREIGN PATENT DOCUMENTS

| | | | | |
|---|---|---|---|---|
| JP | 2006069503 A | * | 3/2006 | ............... B62K 5/01 |
| JP | 2023139908 A | * | 10/2023 | |

OTHER PUBLICATIONS

JP-2006069503-A English Translation (Year: 2006).*
JP-2023139908-A English Translation (Year: 2023).*

*Primary Examiner* — Michael T. Walsh
(74) *Attorney, Agent, or Firm* — XSENSUS LLP

(57) ABSTRACT

An off-road vehicle includes an intake duct and an air cleaner. The intake duct defines a clean conduit. The air cleaner is connected to the intake duct and includes an air cleaner case and an air cleaner element. The air cleaner case defines an internal space of the air cleaner. The air cleaner element is contained in the air cleaner case and divides the internal space into a dirty region and a clean region. The air cleaner element includes a filter. The air cleaner case includes an intake port and an exhaust port. The intake port faces the dirty region. The exhaust port faces the clean region and communicates with the clean conduit of the intake duct. The exhaust port has an exhaust direction oriented upward relative to a horizontal direction.

20 Claims, 20 Drawing Sheets

(56)                    References Cited

U.S. PATENT DOCUMENTS

| | | | |
|---|---|---|---|
| 8,292,979 B2 * | 10/2012 | Conrad | A47L 9/1691 |
| | | | 55/467 |
| 10,668,979 B2 * | 6/2020 | Okada | B62K 19/48 |
| 11,970,999 B2 * | 4/2024 | Gateau | F02M 35/0202 |
| 2020/0332748 A1 | 10/2020 | Xie | |
| 2021/0339179 A1 | 11/2021 | Que et al. | |

* cited by examiner

Intake

OFF-ROAD VEHICLE

BACKGROUND OF THE INVENTION

Field of the Invention

The present disclosure relates to an off-road vehicle including an air cleaner.

Description of the Related Art

Off-road vehicles including internal combustion engines include intake conduits through which ambient air is supplied to the internal combustion engines for combustion purposes. Off-road vehicles including continuously variable transmissions include intake conduits through which ambient air is supplied to the continuously variable transmissions for cooling purposes. These intake conduits, at their internal spaces, can be divided into a dirty side and a clean side by an air cleaner. The internal combustion engine and the continuously variable transmission are heavy objects, and as such provided at a lower portion of an off-road vehicle. An exhaust port of the air cleaner is provided at a lower portion of a case of the air cleaner.

There may be a case where dust or water unintentionally passes through an air cleaner element provided in the interior of the air cleaner. In this case, dust or water is likely to reach an exhaust port of the air cleaner under the dust or water's own weight. There also may be a case where dust attached to the air cleaner element scatters and then falls under the dust's own weight during maintenance of the air cleaner. The falling dust is likely to enter the exhaust port of the air cleaner.

It is an object of one embodiment of the present disclosure to prevent dust or water from entering the clean side of an intake conduit in an air cleaner of an off-road vehicle.

SUMMARY

According to the one embodiment of the present disclosure, an off-road vehicle includes an intake duct and an air cleaner. The intake duct defines a clean conduit. The air cleaner is connected to the intake duct and includes an air cleaner case and an air cleaner element. The air cleaner case defines an internal space of the air cleaner. The air cleaner element is contained in the air cleaner case and divides the internal space into a dirty region and a clean region. The air cleaner element includes a filter. The air cleaner case includes an intake port and an exhaust port. The intake port faces the dirty region. The exhaust port faces the clean region and communicates with the clean conduit of the intake duct. The exhaust port has an exhaust direction oriented upward relative to a horizontal direction.

In this configuration, even if dust or water scatters near the exhaust port in the internal space of the air cleaner case, the dust or water falls downward under the dust or water's own weight. This makes it difficult for the scattering dust or water to enter the exhaust port of the air cleaner case, preventing the clean side of the intake conduit from being contaminated by dust or water.

According to another embodiment of the present disclosure, an off-road vehicle includes an intake duct and an air cleaner. The intake duct defines a clean conduit. The air cleaner is connected to the intake duct and includes an air cleaner case and an air cleaner element. The air cleaner case defines an internal space of the air cleaner. The air cleaner element is contained in the air cleaner case and divides the internal space into a dirty region and a clean region. The air cleaner element includes a filter. The air cleaner case includes an intake port, an exhaust port, a case body, and a lid. The intake port faces the dirty region. The exhaust port faces the clean region and communicates with the clean conduit of the intake duct. The case body includes the exhaust port and an opening through which the internal space is exposed downward. The opening is shaped and sized to permit the air cleaner element to pass through the opening. The lid is configured to close the opening of the case body from below the opening.

This configuration prevents dust or water in the dirty region from moving into the clean region when the air cleaner element is replaced for maintenance purposes.

DETAILED DESCRIPTION

An embodiment will be described by referring to the accompanying drawings. In the following description, directions are based on an off-road vehicle 1 unless otherwise defined individually. Specifically, a front-rear direction corresponds to a vehicle length direction of the off-road vehicle 1, and a right-left direction corresponds to a width direction of the off-road vehicle 1.

Figure 1:
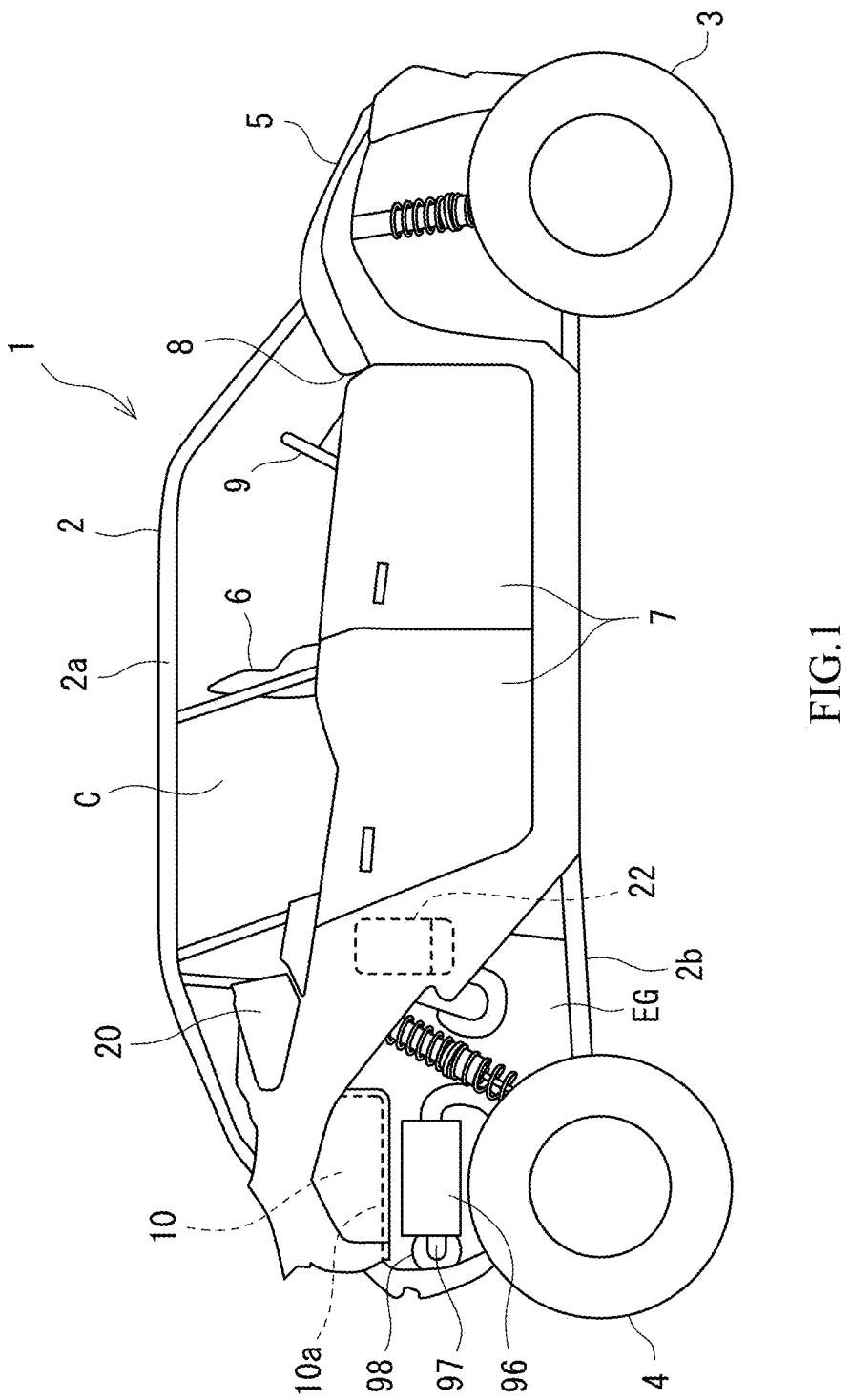
FIG. 1 is a right side view of an off-road vehicle according to an embodiment.

FIG. 1 is a right side view of the off-road vehicle 1 according to this embodiment. As illustrated in FIG. 1, the off-road vehicle 1 includes a vehicle body frame 2, a pair of right and left front wheels 3, and a pair of right and left rear wheels 4. The pair of front wheels 3 support a front portion of the vehicle body frame 2. The pair of rear wheels 4 support a rear portion of the vehicle body frame 2. The vehicle body frame 2 a pipe frame made up of a plurality of pipes connected to each other. The front wheels 3 and the rear wheels 4 each include a balloon tire for irregular ground travel purposes. There is a space between the right and left front wheels 3. The space is covered by a hood 5 from above the space.

A passenger sheet 6 is provided behind the hood 5. The passenger sheet 6 is supported by the vehicle body frame 2 and includes a driver sheet. The vehicle body frame 2 includes elements such as a cabin frame 2a. The cabin frame 2a surrounds a cabin C, where the passenger sheet 6 is provided. The cabin C is exposed to the outside. Side doors 7 are provided at one side of the cabin C. A dash panel 8 is provided in front of the driver sheet. A handle 9 is provided on the dash panel 8 and protrudes toward the driver sheet.

A cargo bed 10 is provided behind the cabin frame 2a. The cargo bed 10 is supported by a rear frame 2b (see FIG. 4) of the vehicle body frame 2. The cargo bed 10 defines a storage space S. The storage space S has a depressed shape and is open to the outside. An engine room ER is provided behind the cabin frame 2a and under the cargo bed 10. The engine room ER is partially covered by a side cowl 11. The side cowl 11 is exposed outward in a width direction of the off-road vehicle 1. The side cowl 11 is supported by the rear frame 2b (see FIG. 4) of the vehicle body frame 2.

In the engine room ER, an internal combustion engine EG and a continuously variable transmission TM are provided. The internal combustion engine EG includes a plurality of cylinders. The continuously variable transmission TM changes in speed the driving force output from the internal combustion engine EG. The internal combustion engine EG and the continuously variable transmission TM are supported by the rear frame 2b of the vehicle body frame 2. The internal combustion engine EG has an intake port connected to an intake system 13 and an exhaust port connected to an exhaust system 14. The intake system 13 includes an air cleaner 22. The air cleaner 22 is covered by the side cowl 11 at an outer side of the air cleaner 22 in the width direction of the off-road vehicle 1, and is hidden in a side view of the off-road vehicle 1. That is, the air cleaner 22 and the side cowl 11 overlap in a side view of the off-road vehicle 1. The side cowl 11 each have a cutout portion 11a. Through cutout portion 11a, the engine room ER is partially exposed outward in the width direction of the off-road vehicle 1.

Figure 2:
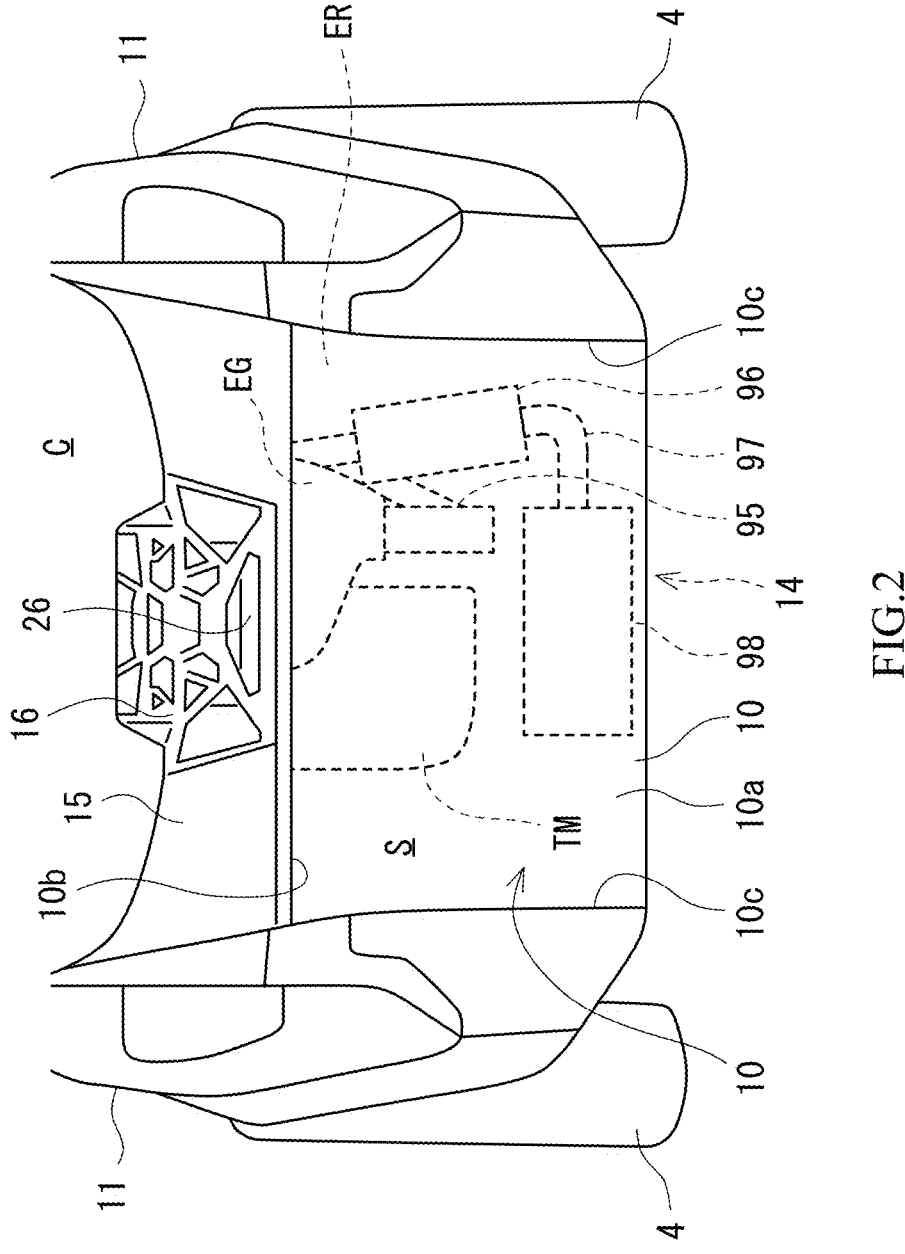
FIG. 2 is a top view of a rear portion of the off-road vehicle illustrated in FIG. 1.

FIG. 2 is a top view of a rear portion of the off-road vehicle 1 illustrated in FIG. 1. As illustrated in FIG. 2, the cargo bed 10 of the off-road vehicle 1 has a bottom wall 10a, a front wall 10b, and a pair of side walls 10c. The front wall 10b protrudes upward from a front side of the bottom wall 10a. One of the side walls 10c protrudes upward from a right side of the bottom wall 10a, and the other of the side walls 10c protrudes upward from a left side of the bottom wall 10a. That is, the storage space S of the cargo bed 10 is defined by the bottom wall 10a, the front wall 10b, and the pair of side walls 10c, and is open upward and rearward.

The engine room ER is covered by the cargo bed 10 and an engine room cover 15 from above the engine room ER. The engine room cover 15 is provided between the cabin C and the cargo bed 10 in the front-rear direction. The engine room cover 15 is provided over the internal combustion engine EG. The engine room cover 15 has a window opening WD. The window opening WD is open in a vertical direction. Through the window opening WD, an intercooler 26 (see FIG. 5) is exposed. The intercooler 26 is provided in the engine room ER. A protection cover 16 is mounted on the engine room cover 15. The protection cover 16 covers the window opening WD from above the window opening WD.

The internal combustion engine EG and the continuously variable transmission TM overlap the engine room cover 15 and the bottom wall 10a of the cargo bed 10 in a top view of the off-road vehicle 1. The exhaust system 14 is provided immediately under the bottom wall 10a of the cargo bed 10. The exhaust system 14 includes a first exhaust pipe 95, a first muffler 96, a second exhaust pipe 97, and a second muffler 98. The first muffler 96 and the second muffler 98 are provided immediately under the bottom wall 10a of the cargo bed 10. The first exhaust pipe 95 is connected to the exhaust port of the internal combustion engine EG. The first muffler 96 is connected to the first exhaust pipe 95. The second exhaust pipe 97 is connected to the first muffler 96. The second muffler 98 is connected to the second exhaust pipe 97. With this configuration, exhaust gas discharged through the exhaust port of the internal combustion engine EG passes through the first exhaust pipe 95, the first muffler 96, the second exhaust pipe 97, and the second muffler 98, in this order, and is discharged into ambient air through the second muffler 98.

Figure 3:
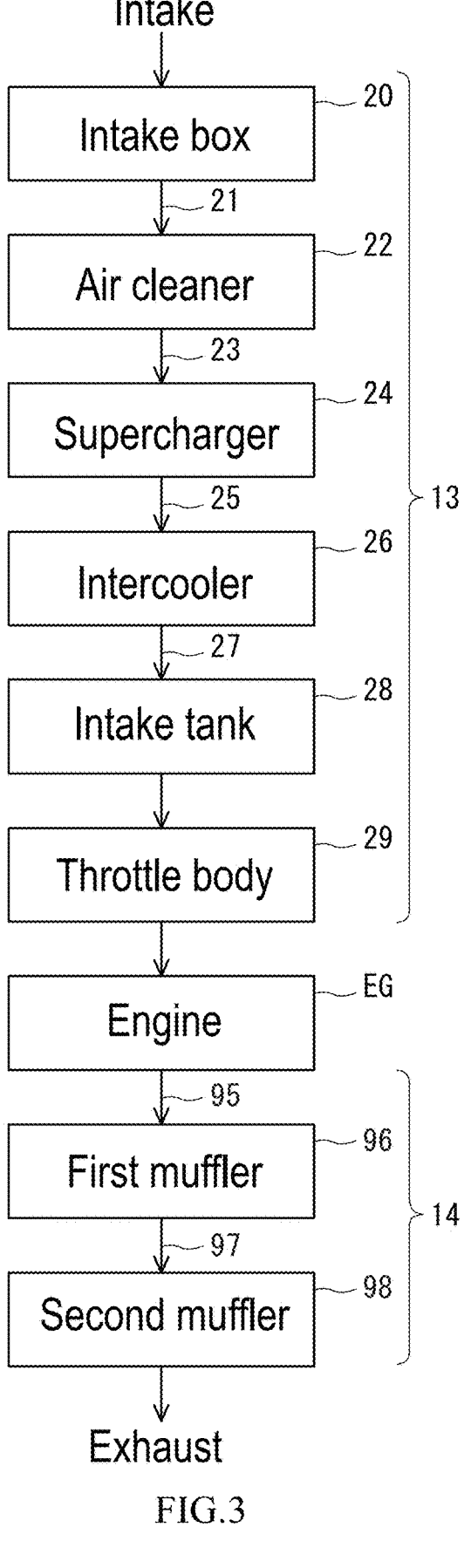
FIG. 3 is a block diagram of an intake system and an exhaust system of the off-road vehicle illustrated in FIG. 1.

FIG. 3 is a block diagram of the intake system 13 and the exhaust system 14, which serve for the internal combustion engine EG of the off-road vehicle 1 illustrated in FIG. 1. As illustrated in FIG. 3, the intake system 13 includes an intake box 20, a first intake duct 21, the air cleaner 22, a second intake duct 23, a supercharger 24, a third intake duct 25, the intercooler 26, a fourth intake duct 27, an intake tank 28, and a throttle body 29. By causing negative pressure to occur at the intake port of the internal combustion engine EG, ambient air is absorbed into the intake box 20 as intake air. The intake air in the intake box 20 passes through the first intake duct 21, the air cleaner 22, the second intake duct 23, the supercharger 24, the third intake duct 25, the intercooler 26, the fourth intake duct 27, the intake tank 28, and the throttle body 29, in this order, and enters the intake port of the internal combustion engine EG through the throttle body 29.

The exhaust system 14 includes the first exhaust pipe 95, the first muffler 96, the second exhaust pipe 97, and the second muffler 98. The exhaust gas discharged through the exhaust port of the internal combustion engine EG passes through the first exhaust pipe 95, the first muffler 96, the second exhaust pipe 97, and the second muffler 98, in this order, and is discharged into ambient air through the second muffler 98.

Figure 4:
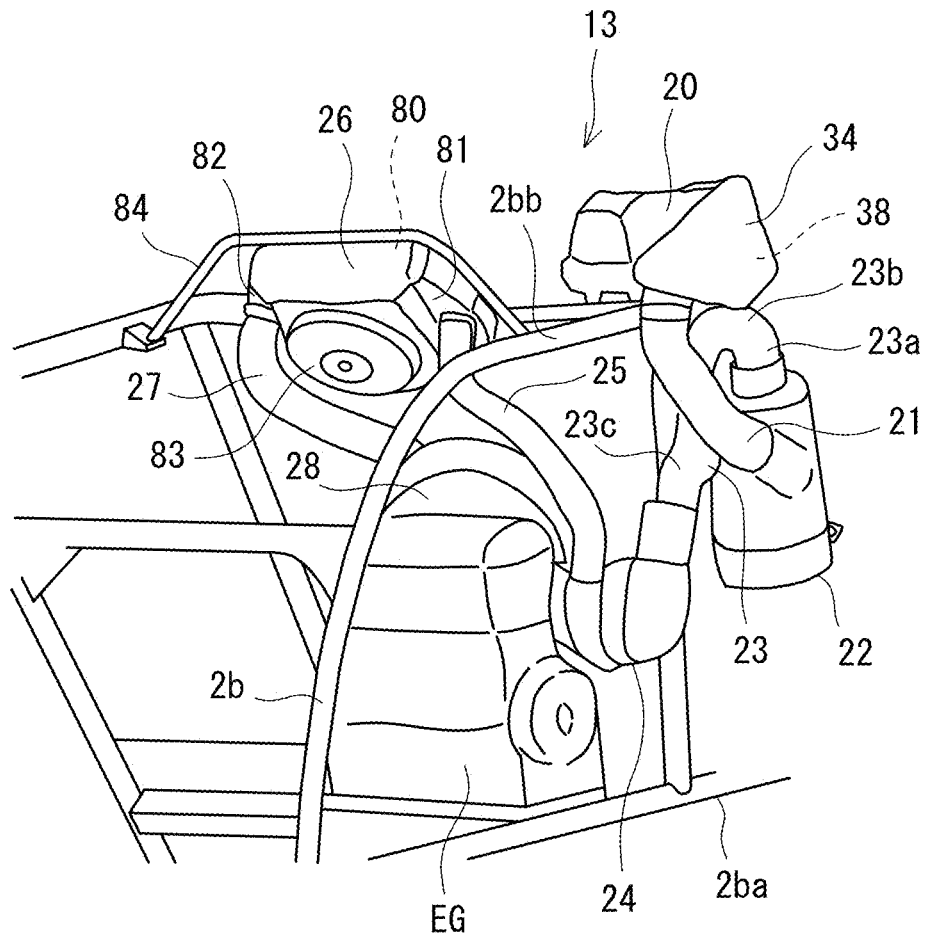
FIG. 4 is a diagonally right rear view of the intake system of the off-road vehicle illustrated in FIG. 1.
Figure 5:
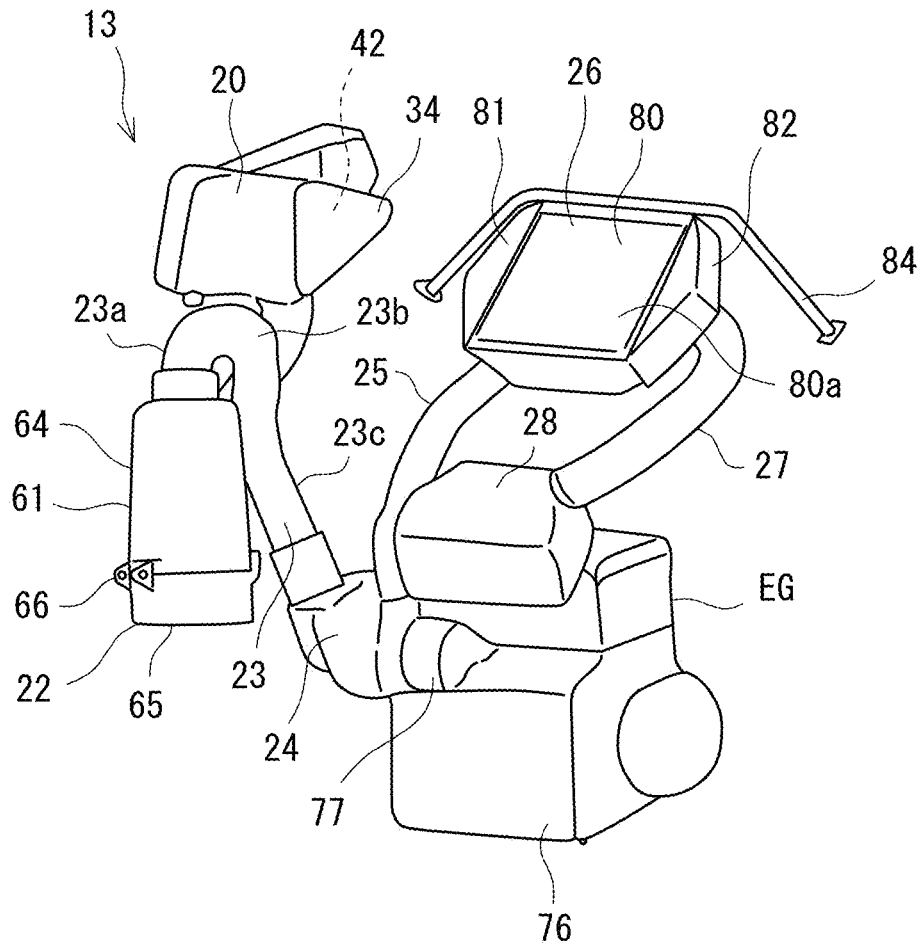
FIG. 5 is a diagonally left front view of the intake system illustrated in FIG. 4.

FIG. 4 is a diagonally right rear view of the intake system 13 of the off-road vehicle 1 illustrated in FIG. 1. FIG. 5 is a diagonally left front view of the intake system illustrated in FIG. 4. As illustrated in FIGS. 4 and 5, the internal combustion engine EG and the intake system 13 are supported by the rear frame 2b of the vehicle body frame 2. The rear frame 2b includes a lower frame 2ba and an upper frame 2bb. The lower frame 2ba is provided above the upper frame 2bb. The internal combustion engine EG is provided above the lower frame 2ba and below the upper frame 2bb. The intake box 20 and the intercooler 26 are provided at positions higher than the internal combustion engine EG. The intake box 20 and the intercooler 26 are provided at positions higher than the upper frame 2bb. The air cleaner 22 is provided at a position higher than the internal combustion engine EG. The intake box 20 is provided at a position higher than the air cleaner 22.

As illustrated in FIG. 1, the intake box 20 is provided at a position higher than the side doors 7. The intake box 20 is provided behind the cabin C and in front of the storage space S of the cargo bed 10. The air cleaner 22 is provided at a position higher than the rear wheels 4.

As illustrated in FIGS. 4 and 5, the internal combustion engine EG and the intercooler 26 are provided approximately at a center of the off-road vehicle 1 in its width direction. The intake box 20 and the air cleaner 22 are provided at one side of the off-road vehicle 1 in its width direction. For example, the intake box 20 and the air cleaner 22 are provided at the right side of the off-road vehicle 1. The intake box 20 and the air cleaner 22 are provided further outward than the rear frame 2b in the width direction of the off-road vehicle 1. The supercharger 24 is provided below the air cleaner 22. The supercharger 24 is provided at a height where the supercharger 24 and the internal combustion engine EG overlap. The supercharger 24 is provided at one side of the internal combustion engine EG and in front of the internal combustion engine EG. The supercharger 24 is driven by, for example, motive power extracted from the internal combustion engine EG. A power transmission unit 77 is provided in a crankcase 76 of the internal combustion engine EG. The power transmission unit 77 contains a power transmission mechanism that is power-transmittably connected to a crank shaft in the crankcase 76 and that is connected to a drive shaft of the supercharger 24. With this configuration, the drive force of the crank shaft of the internal combustion engine EG is input to the supercharger 24 through the power transmission unit 77.

The intake box 20 has an internal space 33. The intake box 20 has a plurality of first openings 38. The internal space 33 communicates with the outside of the off-road vehicle 1 through the first openings 38. The first openings 38 of the intake box 20 are covered by a filter 34. The intake box 20 is connected to the air cleaner 22 via the first intake duct 21. The air cleaner 22 is connected to the supercharger 24 via the second intake duct 23.

The second intake duct 23 is provided at a height included in the height range of the first intake duct 21. The second intake duct 23 includes a first portion 23a, a second portion 23b, and a third portion 23c. The first portion 23a of the second intake duct 23 protrudes upward from the air cleaner 22. The second portion 23b of the second intake duct 23 is curved downward from the first portion 23a. That is, the second portion 23b has an inversed U shape. The third portion 23c extends toward the supercharger 24 from the second portion 23b. This configuration ensures that the air cleaner 22, which is provided above the supercharger 24, can be provided near the supercharger 24 in a horizontal direction, increasing the degree of layout freedom in the interior of the off-road vehicle 1.

The supercharger 24 is connected to the intercooler 26 via the third intake duct 25. The intercooler 26 is provided along an intake conduit extending from the supercharger 24 toward the internal combustion engine EG, and is provided above the internal combustion engine EG. The intercooler 26 includes an intercooler core 80, an inlet tank 81, and an outlet tank 82. The intercooler core 80 has an upper surface that faces forward and upward. With this configuration, a rear edge of the upper surface of the intercooler core 80 is higher than a front edge of the upper surface of the intercooler core 80. The intercooler 26 is supported by the upper frame 2bb of the rear frame 2b via a bracket 84. The third intake duct 25 is connected to the inlet tank 81 of the intercooler 26. The outlet tank 82 of the intercooler 26 is connected to the intake tank 28 via the fourth intake duct 27.

The inlet tank 81 is provided at one side of the intercooler core 80 in the width direction of the off-road vehicle 1, and is fluidly connected to the intercooler core 80. The outlet tank 82 is provided at the other side of the intercooler core 80 in the width direction of the off-road vehicle 1, and is fluidly connected to the intercooler core 80. Air from the supercharger 24 flows through the third intake duct 25 and enters the inlet tank 81. The air inside the inlet tank 81 flows into the intercooler core 80. The air flows through the intercooler core 80 and flows into the outlet tank 82. The air flowing inside the intercooler core 80 is cooled by heat exchange with ambient air. This configuration ensures that the air heated at the supercharger 24 is cooled at the intercooler 26, and the cooled air is supplied to the internal combustion engine EG. As a result, intake charging efficiency improves in the internal combustion engine EG.

Figure 6:
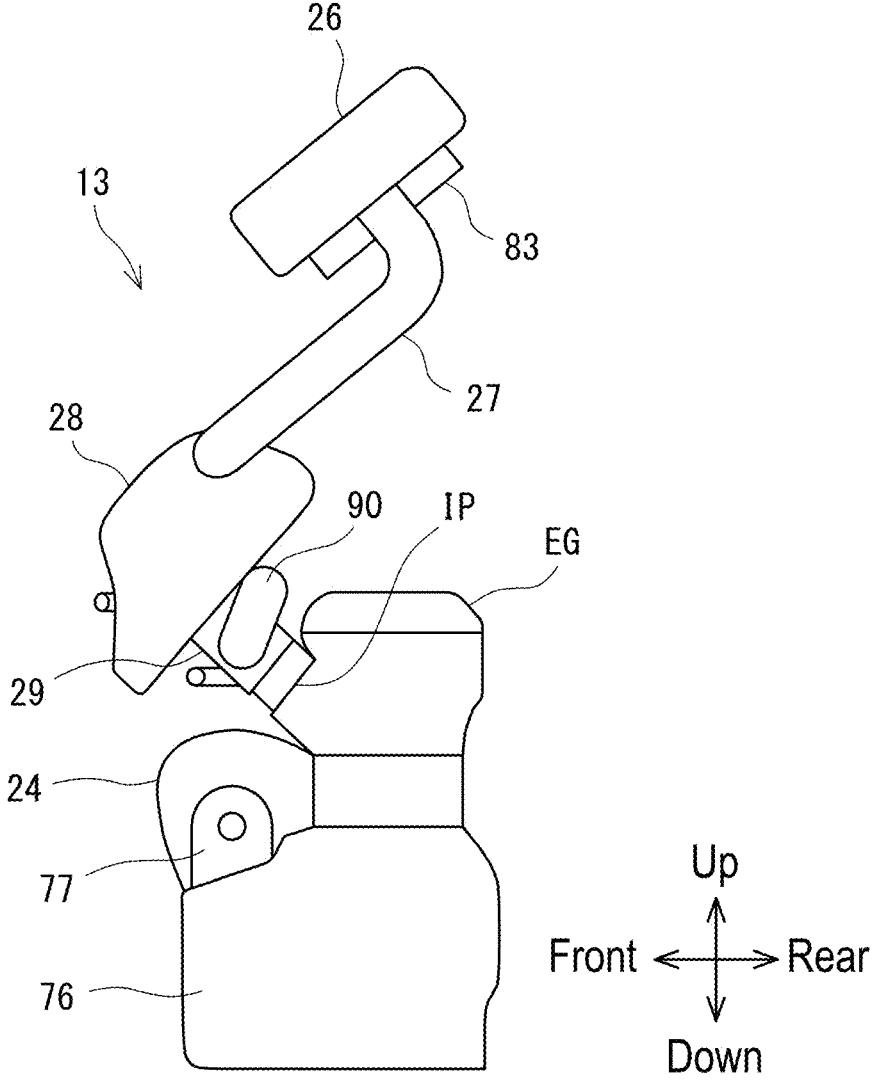
FIG. 6 is a left side view of the internal combustion engine and the intake system illustrated in FIG. 5.

FIG. 6 is a left side view of the internal combustion engine EG and the intake system 13 illustrated in FIG. 5. As illustrated in FIG. 6, the throttle body 29 is connected to the intake port. IP, of the internal combustion engine EG. The throttle body 29 is provided with an electric motor 90. The electric motor 90 drives a throttle valve 89 (see FIG. 21). The intake tank 28 is connected to the throttle body 29. The intake tank 28 defines an intake chamber CH. The intake chamber CH communicates with an intake conduit 88 of the throttle body 29.

The intake tank 28 is provided above the throttle body 29. The intake tank 28 is provided immediately above the supercharger 24 in a side view of the off-road vehicle 1. The intercooler 26 is provided above the intake tank 28. The intercooler 26, the intake tank 28, and the throttle body 29 overlap in position in the front-rear direction of the off-road vehicle 1. This overlap configuration ensures that the apparatuses and/or devices associated with the internal combustion engine EG are provided in a compact arrangement in the front-rear direction of the off-road vehicle 1, increasing the degree of layout freedom in the off-road vehicle 1.

Figure 7:
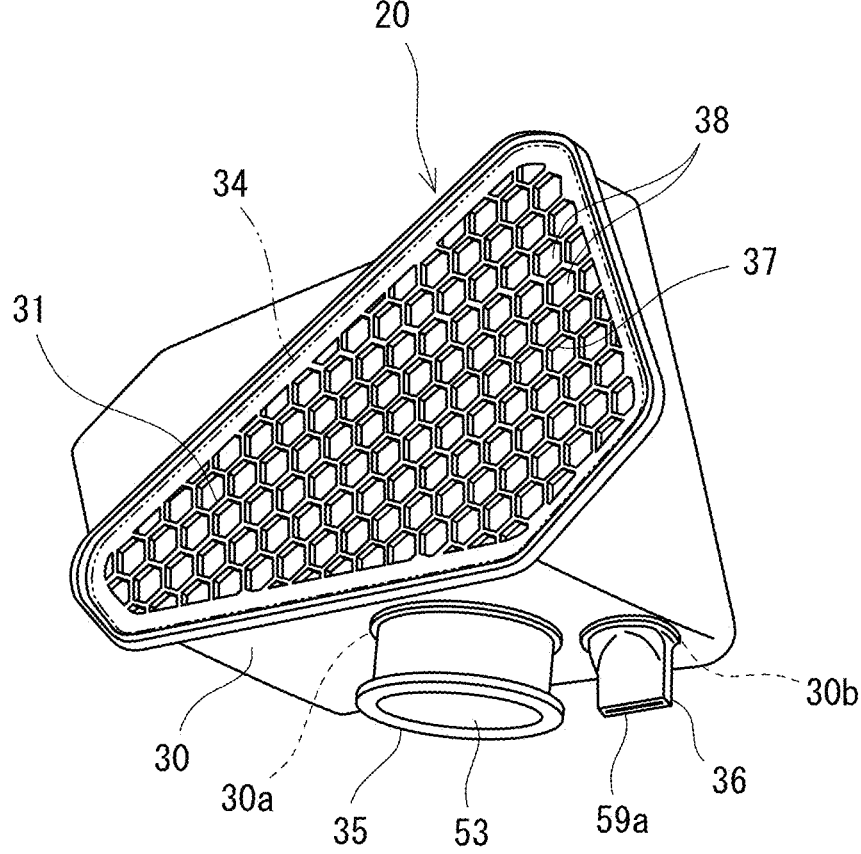
FIG. 7 is a lower right view of an intake box of the off-road vehicle illustrated in FIG. 1.
Figure 8:
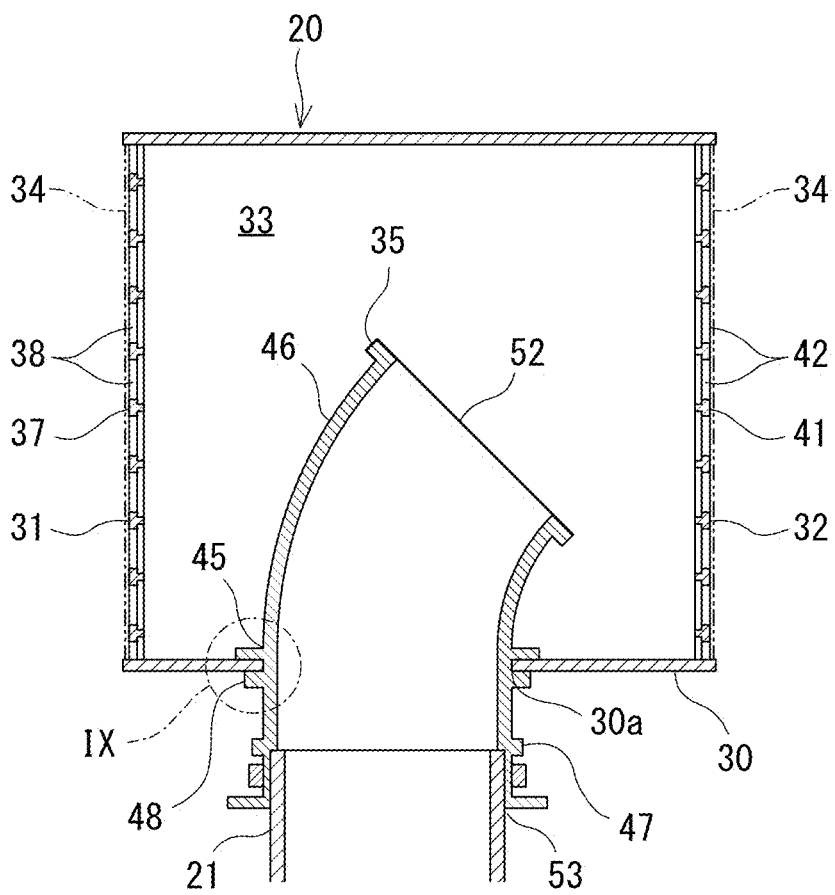
FIG. 8 is a front side cross-sectional view of the intake box illustrated in FIG. 7.

FIG. 7 is a lower right view of the intake box 20 of the off-road vehicle 1 illustrated in FIG. 1. FIG. 8 is a front side cross-sectional view of the intake box 20 illustrated in FIG. 7. As illustrated in FIGS. 7 and 8, the intake box 20 includes a bottom wall 30. The bottom wall 30 has a duct fit hole 30a and a drain hole 30b. The duct fit hole 30a of the bottom wall 30 is fitted with an introduction duct 35. The introduction duct 35 communicates the internal space 33 of the intake box 20 with the first intake duct 21 (see FIG. 4). The drain hole 30b of the bottom wall 30 is fitted with an elastic drain nozzle 36. The elastic drain nozzle 36 communicates the internal space 33 of the intake box 20 with the outside of the intake box 20.

The intake box 20 has a right side wall 31 and a left side wall 32. The right side wall 31 protrudes upward from a right side edge of the bottom wall 30 in the width direction of the off-road vehicle 1. The left side wall 32 protrudes upward from a left side edge of the bottom wall 30 in the width direction of the off-road vehicle 1. The intake box 20 has a front wall, a rear wall, and a top wall, in addition to the bottom wall 30, the right side wall 31, and the left side wall 32. The right side wall 31 and the left side wall 32 are meshed walls. In this embodiment, the right side wall 31 will be referred to as first mesh wall 31, and the left side wall 32 will be referred to as second mesh wall 32. The first mesh wall 31 includes frames 37. The frames 37 define the plurality of first openings 38, through which the internal space 33 of the intake box 20 communicates with the outside of the off-road vehicle 1. Similarly, the second mesh wall 32 includes frames 41. The frames 41 define a plurality of second openings 42, through which the internal space 33 of the intake box 20 communicates with the outside of the off-road vehicle 1. Through the first openings 38, the internal space 33 is open outward in the width direction of the off-road vehicle 1. Through the second openings 42, the internal space 33 is open inward in the width direction of the off-road vehicle 1.

The first mesh wall 31 has such a honeycomb structure that the first openings 38 each have a hexagonal shape (see FIG. 7). Similarly, the second mesh wall 32 has such a honeycomb structure that the second openings 42 each have a hexagonal shape. A filter 34 is attached on an outer surface of the first mesh wall 31 of the intake box 20, and another filter 34 is attached on an outer surface of the second mesh wall 32 of the intake box 20. That is, the first openings 38 of the first mesh wall 31 are covered by a filter 34, and the second openings 42 of the second mesh wall 32 are covered by another filter 34.

As illustrated in FIG. 8, the introduction duct 35 includes a fit cylinder 45, an upper cylinder 46, and a lower cylinder 47. The fit cylinder 45 is fitted with the duct fit hole 30a of the bottom wall 30. The fit cylinder 45 has a ring-shaped recess 48. The ring-shaped recess 48 extends in a circumferential direction of the introduction duct 35 and is open outward in a horizontal direction. The ring-shaped recess 48 is a recess in which a circumferential edge portion of the duct fit hole 30a of the bottom wall 30 is inserted. The lower cylinder 47 protrudes downward from the fit cylinder 45. The lower cylinder 47 is provided at the outside of the intake box 20. The lower cylinder 47, at its lower end, has an outlet 53 for a conduit of the introduction duct 35. An upstream end portion of the first intake duct 21 is attached to the lower cylinder 47 of the introduction duct 35.

The upper cylinder 46 protrudes upward from the fit cylinder 45. The upper cylinder 46 is provided in the internal space 33 of the intake box 20. That is, the introduction duct 35 protrudes upward from the bottom wall 30 toward the internal space 33. The upper cylinder 46, at its upper end, has an inlet 52 for the conduit of the introduction duct 35. The inlet 52 of the introduction duct 35 is provided at a position higher than the bottom wall 30 in the internal space 33 of the intake box 20. In this configuration, if dust or water enters the internal space 33 of the intake box 20 through the first openings 38 or the second openings 42, the dust or water accumulates on the bottom wall 30 of the intake box 20 under the dust or water's own weight. Thus, since the inlet 52 is provided at a position higher than the bottom wall 30, it is difficult for dust or water to enter the inlet 52 of the introduction duct 35.

The introduction duct 35 protrudes upward from the bottom wall 30 and is curved in a direction away from the first openings 38. The inlet 52 of the introduction duct 35 faces in a direction away from the first openings 38. The inlet 52 of the introduction duct 35 is oriented in a direction toward the second openings 42. The second openings 42 (toward which the inlet 52 of the introduction duct 35 is oriented) faces inward in the width direction of the off-road vehicle 1. This makes it difficult for dust or water to pass through the second openings 42. Thus, even if dust or water has entered the internal space 33 through the first openings 38, which face outward in the width direction of the off-road vehicle 1, it is difficult for the dust or water to enter the inlet 52 of the introduction duct 35. At the same time, a smooth intake-air flow is maintained in the introduction duct 35.

Figure 9:
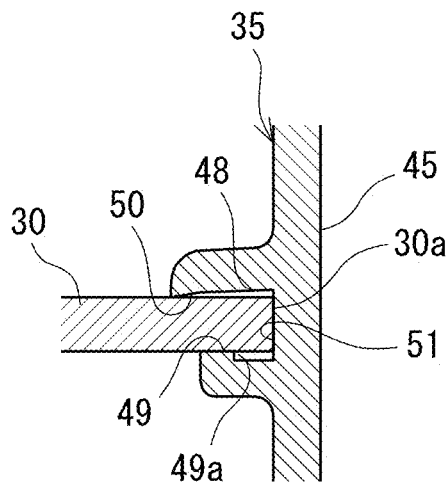
FIG. 9 is an enlarged view of a part IX illustrated in FIG. 8.

FIG. 9 is an enlarged view of a part IX illustrated in FIG. 8. As illustrated in FIG. 8, the ring-shaped recess 48 of the fit cylinder 45 of the introduction duct 35 has a toroidal lower surface 49, a toroidal upper surface 50, and an outer circumferential surface 51. The upper surface 50 is spaced upward from the lower surface 49 and faces the lower surface 49 in the vertical direction. The outer circumferential surface 51 connects an inner circumferential edge of the lower surface 49 to an inner circumferential edge of the upper surface 50. The lower surface 49 of the ring-shaped recess 48 is in contact with an upper surface of a circumferential edge portion of the duct fit hole 30a of the intake box 20. The upper surface 50 of the ring-shaped recess 48 is in contact with a lower surface of the circumferential edge portion of the duct fit hole 30a of the intake box 20. The outer circumferential surface 51 of the ring-shaped recess 48 is in contact with an inner circumferential surface of the circumferential edge portion of the duct fit hole 30a of the intake box 20.

A ring-shaped step 49a is provided on at least one surface among the lower surface 49 of the ring-shaped recess 48, the upper surface 50 of the ring-shaped recess 48, and the outer circumferential surface 51 of the ring-shaped recess 48. The ring-shaped step 49a extends in the circumferential direction of the introduction duct 35. In this embodiment, the ring-shaped step 49a is provided on the lower surface 49 of the ring-shaped recess 48. The ring-shaped step 49a has a radially outward portion and a radially inward portion. The radially outward portion protrudes beyond the radially inward portion toward the bottom wall 30. Thus, the circumferential ring-shaped step 49a is formed at the ring-shaped recess 48 of the introduction duct 35. This configuration ensures that even if water enters the ring-shaped recess 48 of the introduction duct 35 from outside the intake box 20, it is difficult for the water to reach the internal space 33 of the intake box 20.

Figure 10:
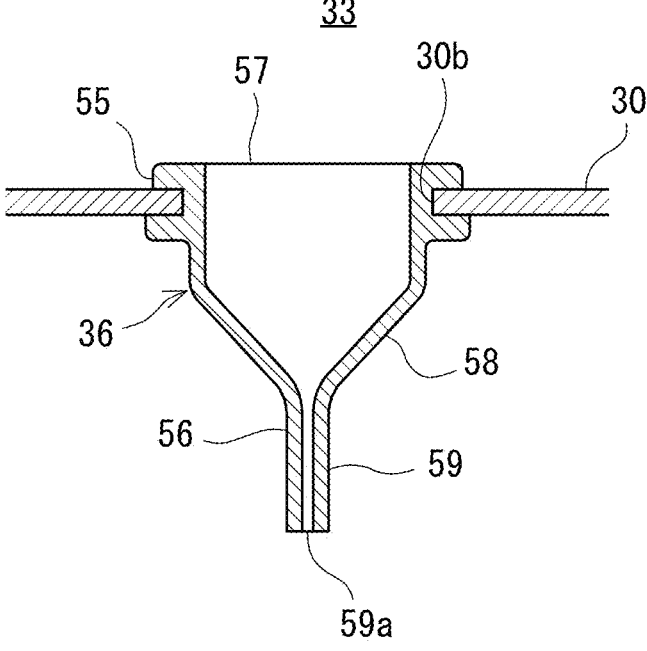
FIG. 10 is a cross-sectional view of an elastic drain nozzle illustrated in FIG. 8.

FIG. 10 is a cross-sectional view of the elastic drain nozzle 36 illustrated in FIG. 7. As illustrated in FIG. 10, the elastic drain nozzle 36 includes a fit cylinder 55 and a lower cylinder 56. The fit cylinder 55 has a toroidal shape. The fit cylinder 55 is fitted with the drain hole 30b of the bottom wall 30 of the intake box 20. The fit cylinder 55 has an inlet 57 at an upper end of the fit cylinder 55. The inlet 57 serves as an intake port for a conduit of the elastic drain nozzle 36, and faces the internal space 33. The inlet 57 of the elastic drain nozzle 36 is provided at a position lower than the inlet 52 of the introduction duct 35 in the internal space 33 of the intake box 20.

The lower cylinder 56 protrudes downward from the fit cylinder 55. The lower cylinder 56 has a tapered portion 58 and a flat portion 59. The tapered portion 58 protrudes downward from the fit cylinder 55. The flat portion 59 protrudes downward from the tapered portion 58. The flat portion 59 has a flat, elliptical cross-section. The tapered portion 58 has a horizontal cross-section that changes from a circular cross-section to a flat, elliptical cross-section in a direction from the lower cylinder 56 toward the flat portion 59. The flat portion 59 has a slit outlet 59a at a lower end of the flat portion 59. The slit outlet 59a serves as an exhaust port for the conduit of the elastic drain nozzle 36, and faces the outside of the off-road vehicle 1.

When negative pressure is caused to occur at the intake port of the internal combustion engine EG, the negative pressure is transmitted to the internal space 33 of the intake box 20 through the first intake duct 21. Upon arrival of the negative pressure to the internal space 33, the slit outlet 59a of the elastic drain nozzle 36 is elastically deformed to close the flat portion 59. By closing the flat portion 59, water is prevented from entering the conduit of the elastic drain nozzle 36 from outside the intake box 20 and entering the internal space 33 of the intake box 20. When there is a low level of negative pressure in the internal space 33 of the intake box 20, the outlet 59a of the elastic drain nozzle 36 is open. When the outlet 59a is open, water accumulating on the bottom wall 30 of the intake box 20 passes through the conduit of the elastic drain nozzle 36 and is discharged to the outside.

Figure 11:
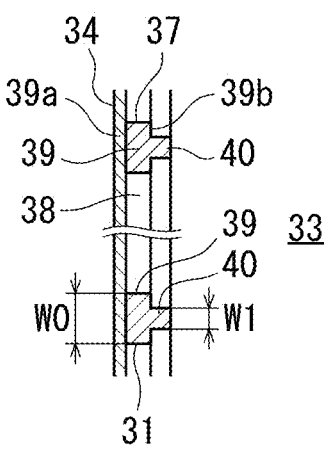
FIG. 11 is an enlarged cross-sectional view of a mesh wall of the intake box illustrated in FIG. 7.

FIG. 11 is an enlarged cross-sectional view of the first mesh wall 31 of the intake box 20 illustrated in FIG. 7. As illustrated in FIG. 11, at least one frame 37 of the frames 37 of the first mesh wall 31 includes a base 39 and a rib 40. In this embodiment, all the frames 37 of the first mesh wall 31 each include a base 39 and a rib 40. The base 39 has an outer surface 39a and an inner surface 39b. The outer surface 39a faces the outside of the intake box 20. The inner surface 39b faces the internal space 33 of the intake box 20. The rib 40 protrudes toward the internal space 33 from the inner surface 39b of the base 39. The rib 40 extends in the direction in which the frame 37 extends. The ribs 40 define a plurality of closed loops surrounding the plurality of first openings 38. The outer surface 39a of the base 39 has a width of W0, and the rib 40 of the base 39 has a width of W1. The outer surface 39a has such a flat surface that W0 is larger than W1. The filter 34 is in contact with the outer surface 39a of the base 39. The outer surface as a whole of the first mesh wall 31 which outer surface is located at the outer side in the width direction of the off-road vehicle 1 is a flat surface forming a single plane.

Due to the existence of the ribs 40, the first mesh wall 31 is difficult to elastically deform, even when intake-caused negative pressure acts on the first mesh wall 31. With this configuration, it is not necessary to diminish the first openings 38 of the first mesh wall 31 or diminish the first mesh wall 31 as a whole in order to prevent the first mesh wall 31 from being elastically deformed in the presence of negative pressure. As a result, intake performance is not degraded while the filter 34 is prevented from being removed off the first mesh wall 31, which includes the plurality of first openings 38.

In a cross-section orthogonal to the extending direction of the frame 37, the rib 40 protrudes from a center of the inner surface 39b, which faces the internal space 33. With this configuration, the rib 40 is difficult to visually recognize from outside the off-road vehicle 1, preventing the first mesh wall 31 from being disfigured from an appearance standpoint. At the same time, the strength throughout the first mesh wall 31 is increased in a well-balanced manner. The frames 41 of the second mesh wall 32 each include a base and a rib, similarly to the frames 37 of the first mesh wall 31. The second mesh wall 32, however, is identical in structure to the first mesh wall 31 and will not be elaborated upon here.

Figure 12:
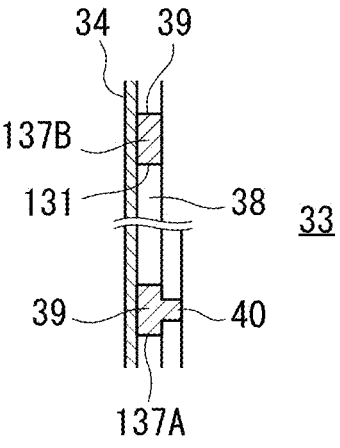
FIG. 12 is an enlarged cross-sectional view of a first modification of the mesh wall illustrated in FIG. 11.

FIG. 12 is an enlarged cross-sectional view of a first modification of the first mesh wall 31 illustrated in FIG. 11. A first mesh wall 131 according to the first modification includes frames 137. In the first modification, only some of the frames 137 include ribs 40. Each of the frames 137 includes a center frame 137A and an outer circumferential frame 137B. The center frame 137A is provided at a center of the first mesh wall 131. The outer circumferential frame 137B is provided at an outer circumference of the first mesh wall 131. The center frame 137A is a frame 137 provided in an area including a geometric center of the first mesh wall 131 as a whole, as viewed from a direction perpendicular to the outer surface 39a of the first mesh wall 131. The outer circumferential frame 137B is provided to surround the center frame 137A, as viewed from the direction perpendicular to the outer surface 39a of the first mesh wall 131. The outer circumferential frame 137B is a frame 137 provided in an area further away from the geometric center of the first mesh wall 131 as a whole than the center frame 137A is away from the geometric center, as viewed from the direction perpendicular to the outer surface 39a of the first mesh wall 131. The outer circumferential frame 137B includes an outer circumference of a frame 137 farthest away from the geometric center of the first mesh wall 131 as a whole, as viewed from the direction perpendicular to the outer surface 39a of the first mesh wall 131.

In the first mesh wall 131, while the center frame 137A includes the base 39 and the rib 40, the outer circumferential frame 137B only includes the base 39, and does not include the rib 40. In this respect, a center portion of the first mesh wall 131 is elastically deformable most greatly. In the configuration in which the outer circumferential frame 137B only includes the base 39, the strength of the center portion of the first mesh wall 131 is increased. As a result, the first mesh wall 131 is effectively prevented from being elastically deformed in the presence of negative pressure. Also, since the outer circumferential frame 137B does not include the rib 40, the first mesh wall 131 is lighter in weight. It is to be noted that the second mesh wall 32 may be similar to the first mesh wall 131.

Figure 13:
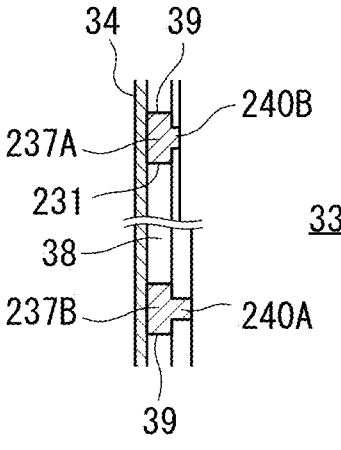
FIG. 13 is an enlarged cross-sectional view of a second modification of the mesh wall illustrated in FIG. 11.

FIG. 13 is an enlarged cross-sectional view of a second modification of the first mesh wall 31 illustrated in FIG. 11. As illustrated in FIG. 13, a first mesh wall 231 according to the second modification includes ribs 240. The ribs 240 vary in the amount of protrusion depending on where the ribs 240 are provided in the first mesh wall 231. In the first mesh wall 231, a center frame 237A includes a base 39 and a rib 240A, and an outer circumferential frame 237B includes a base 39 and a rib 240B. The amount of protrusion of the rib 240B of the outer circumferential frame 237B is smaller than the amount of protrusion of the rib 240A of the center frame 237A.

In this respect, a center portion of the first mesh wall 231 is elastically deformable most greatly. In the configuration in which the ribs 240 vary in the amount of protrusion, the strength of the center portion of the first mesh wall 231 is increased. As a result, the first mesh wall 231 is effectively prevented from being elastically deformed in the presence of negative pressure. Also, since the rib 240 of the outer circumferential frame 237B is smaller, the first mesh wall 231 is lighter in weight. It is to be noted that the second mesh wall 32 may be similar to the first mesh wall 231.

Figure 14:
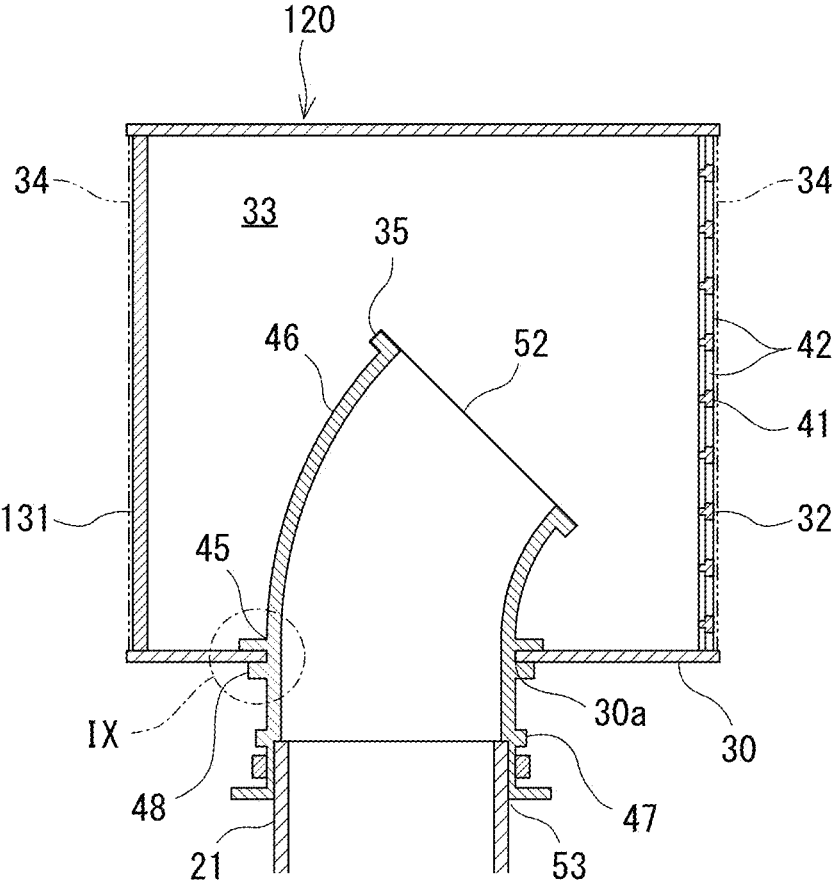
FIG. 14 is a cross-sectional view of a modification of the intake box illustrated in FIG. 8.

FIG. 14 is a cross-sectional view of an intake box 120. The intake box 120 is a modification of the intake box 20 illustrated in FIG. 8. It is to be noted that those elements and/or configurations common to the intake box 20 and the intake box 120 are designated by like or identical reference numerals, and will not be elaborated upon in the following description. As illustrated in FIG. 14, in the intake box 120 according to the modification, the right side wall 31 (which faces outward in the width direction of the off-road vehicle 1) is a nonporous (holeless) plate that closes the internal space 33 from outside in the width direction of the off-road vehicle 1. The left side wall 32 (which faces inward in the width direction of the off-road vehicle 1) is a mesh wall having the plurality of second openings 42 Through the second openings 42, the internal space 33 is exposed inward in the width direction of the off-road vehicle 1. The introduction duct 35 protrudes upward from the bottom wall 30 in a curved manner in a direction away from the right side wall 31 and toward the second openings 42. That is, the inlet 52 of the introduction duct 35 faces in a direction toward the second openings 42.

The internal space 33 of the intake box 120 is blocked by the right side wall 31 from the outside in the width direction of the off-road vehicle 1. This configuration makes it difficult for dust or water to enter the internal space 33. Also, the inlet 52 of the introduction duct 35 faces the second openings 42. This configuration ensures that once ambient air flows into the internal space 33 through the second openings 42, the ambient air is smoothly guided to the inside of the introduction duct 35 through the inlet 52. It is to be noted that the introduction duct 35 may protrude upward from the bottom wall 30 in a curved manner in a direction away from the second openings 42 and toward the right side wall 31. That is, the inlet 52 of the introduction duct 35 may face in a direction away from the second openings 42 and toward the right side wall 31.

Figure 15:
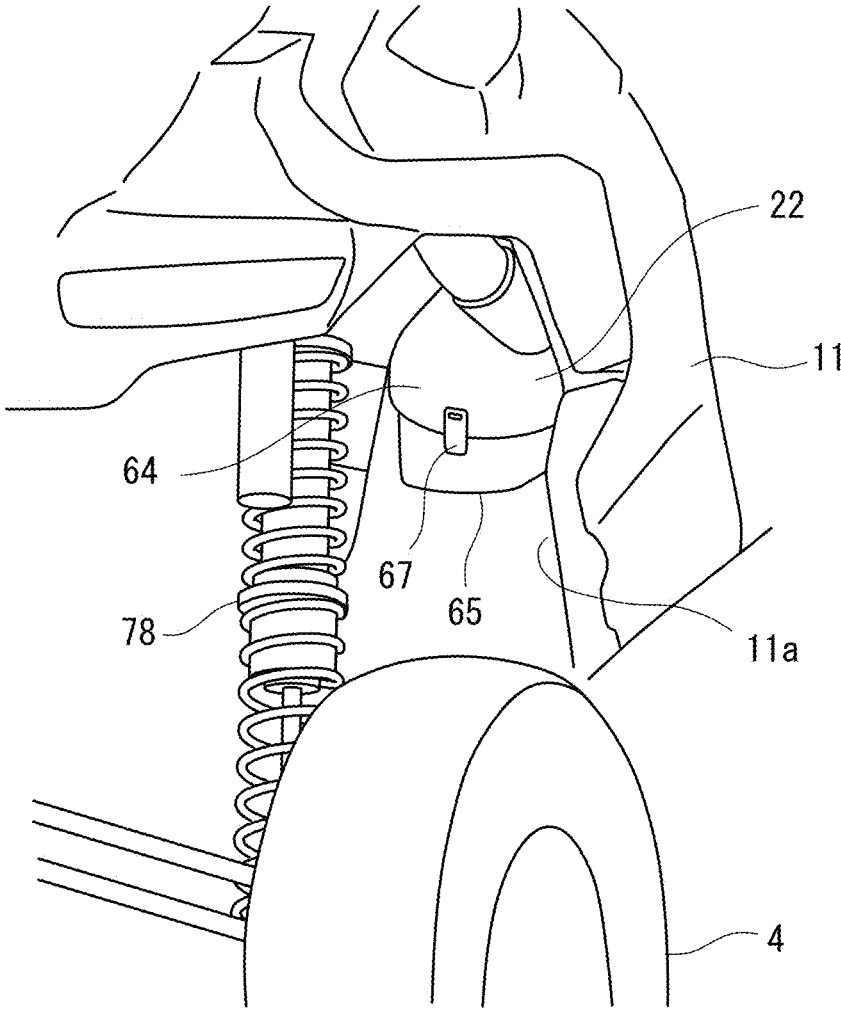
FIG. 15 is a diagonally right rear view of a right rear portion of the off-road vehicle illustrated in FIG. 1.

FIG. 15 is a diagonally right rear view of a right rear portion of the off-road vehicle 1 illustrated in FIG. 1. As illustrated in FIG. 15, the air cleaner 22, which is a part of the intake system 13, is covered by the side cowl 11 at an outer side of the air cleaner 22 in the width direction of the off-road vehicle 1, and is hidden in a side view of the off-road vehicle 1. The side cowl 11 includes the cutout portion 11a, through which the engine room ER is partially exposed outward in the width direction of the off-road vehicle 1. The air cleaner 22 includes a lid 65 and a lock 67. The lid 65 and the lock 67 are exposed in a diagonal rear view of the off-road vehicle 1. The lid 65 of the air cleaner 22 is visually recognized between the side cowl 11 and a rear suspension 78. This configuration makes the air cleaner 22 accessible for maintenance purposes while keeping the off-road vehicle 1 pleasing in appearance.

Figure 16:
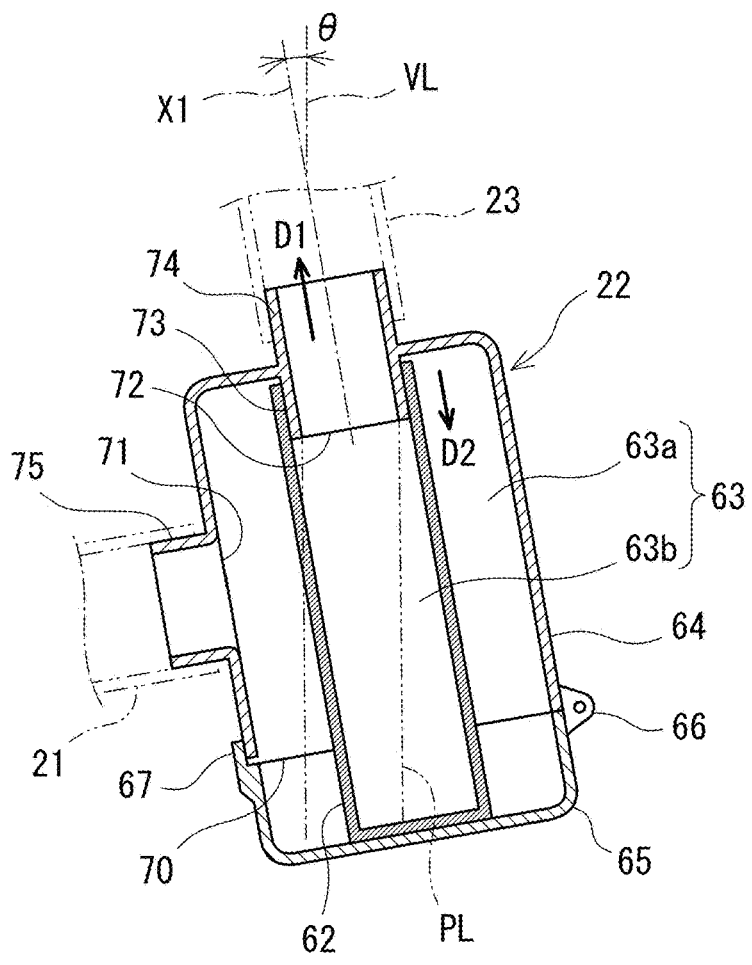
FIG. 16 is a longitudinal sectional view of an air cleaner illustrated in FIG. 4.

FIG. 16 is a longitudinal sectional view of the air cleaner 22 illustrated in FIG. 4. As illustrated in FIG. 16, the air cleaner 22 includes an air cleaner case 61 and an air cleaner element 62. The air cleaner element 62 includes a filter and is contained in the air cleaner case 61. The air cleaner case 61 has an internal space 63. The internal space 63 is divided into a dirty region 63a and a clean region 63b by the air cleaner element 62. Specifically, the dirty region 63a is provided at an upstream side of the air cleaner element 62 in the internal space 63, and the clean region 63b is provided at a downstream side of the air cleaner element 62 in the internal space 63.

The air cleaner case 61 has a round cylinder shape having an axis X1. The air cleaner case 61 includes a case body 64 and the lid 65. The case body 64 has an opening 70, an intake port 71, and an exhaust port 72. Through the opening 70, the internal space 63 is exposed downward. The opening 70 is shaped and sized to permit the air cleaner element 62 to pass through the opening 70. The intake port 71 faces the dirty region 63a. The exhaust port 72 faces the clean region 63b and communicates with a clean conduit of the second intake duct 23.

The lid 65 closes the opening 70 of the case body 64 in a manner in which the opening 70 is openable and closable from below. The lid 65 is attached to the case body 64 rotationally movably on a hinge 66. With the opening 70 of the case body 64 closed, the lid 65 is locked to the case body 64 by the lock 67. By releasing the lock 67 to open the lid 65, dust or water in the dirty region 63a falls through the opening 70 of the case body 64. This configuration prevents the dust or water from moving to the exhaust port 72 when the air cleaner element 62 is removed.

The axis X1 of the air cleaner case 61 is oriented substantially upward and has an angle of θ within a range of less than 45 degrees relative to a vertical line VL as viewed from the horizontal direction. The case body 64 has a cone shape having an inner diameter increasing in a downward direction of the case body 64. This configuration ensures that when dust or water attached to the air cleaner element 62 falls, it is less likely for the dust or water to attach to an inner circumferential surface of the case body 64.

The case body 64 includes an exhaust side inner cylinder 73 and an exhaust side outer cylinder 74. The exhaust side inner cylinder 73 protrudes toward the internal space 63. The exhaust side outer cylinder 74 communicates with the exhaust side inner cylinder 73 and protrudes toward the outside coaxially with the exhaust side inner cylinder 73. The exhaust side inner cylinder 73 and the exhaust side outer cylinder 74 are provided at an upper portion of the case body 64. The second intake duct 23 is connected to the exhaust side outer cylinder 74. The exhaust side inner cylinder 73, at its protrusion end, defines the exhaust port 72. The exhaust port 72 has an axis identical to the axis X1 of the air cleaner case 61. The axis X1 of the exhaust port 72 extends in an exhaust direction D1 of the exhaust port 72. That is, the axis X1 of the exhaust port 72 extends in a protrusion direction D2 of the exhaust side inner cylinder 73.

The air cleaner element 62 has a bottomed cylinder shape. The air cleaner element 62 is fitted with the exhaust side inner cylinder 73 in a direction parallel to the protrusion direction D2 of the exhaust side inner cylinder 73. The protrusion direction D2 of the exhaust side inner cylinder 73 is opposite and parallel to the exhaust direction D1 of the exhaust port 72. Hence, the air cleaner element 62, which has a bottomed cylinder shape, is attached to the exhaust side inner cylinder 73 in the exhaust direction D1 of the exhaust port 72. The exhaust side inner cylinder 73 serves as an element support supporting the air cleaner element 62. By opening the lid 65, the air cleaner element 62 can be inserted into the case body 64 from below the case body 64 through the opening 70. When the air cleaner element 62 is inserted into the case body 64, the air cleaner element 62 can be easily supported by the case body 64.

The air cleaner element 62 supported by the exhaust side inner cylinder 73 is provided radially inward in the case body 64 relative to the inner circumferential surface of the case body 64 so that there is a space between the air cleaner element 62 and the inner circumferential surface of the case body 64. This configuration ensures that when the air cleaner element 62 is attached and/or detached relative to the case body 64, the air cleaner element 62 is prevented from contacting the inner circumferential surface of the case body 64, and dust or water on the air cleaner element 62 is prevented from attaching to the inner circumferential surface of the case body 64.

The case body 64 includes an intake side outer cylinder 75. The intake side outer cylinder 75 protrudes toward the outside. The intake side outer cylinder 75 is provided at a round-cylindrical circumferential wall of the case body 64. The first intake duct 21 is connected to the intake side outer cylinder 75. The intake side outer cylinder 75 defines the intake port 71, which faces the internal space 63. The exhaust port 72 is provided above the intake port 71. The exhaust port 72 is provided at an upper end portion of the air cleaner case 61. This configuration ensures that dust or water is more reliably prevented from entering the exhaust port 72 than when the exhaust port 72 of the air cleaner case 61 is provided at other than the upper end portion of the air cleaner case 61.

The air cleaner case 61 is provided to be oriented such that the exhaust port 72 is visually recognizable when the lid 65 is opened and the air cleaner element 62 is removed from the air cleaner case 61 and when the air cleaner case 61 is seen from vertically below the air cleaner case 61. A phantom line PL indicates a shape of the exhaust port 72 projected vertically downward. The phantom line PL passes through the opening 70. The exhaust direction D1 of the exhaust port 72 is oriented further upward than the horizontal direction. The exhaust direction D1 of the exhaust port 72 is oriented substantially upward and has an angle θ within a range of less than 45 degrees relative to the vertical line VL as viewed from the horizontal direction. This configuration of the intake port 71 ensures that dust or water scattering near the exhaust port 72 in the internal space 63 of the air cleaner case 61 moves downward under the dust or water's own weight. As a result, when the air cleaner element 62 is replaced, it is difficult for the dust or water to enter the exhaust port 72.

Figure 17:
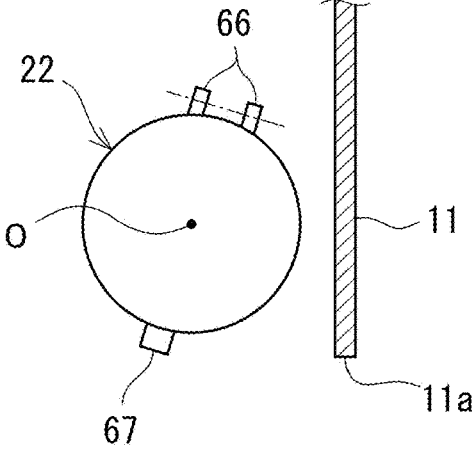
FIG. 17 is a top view of the air cleaner illustrated in FIG. 16 and a surrounding of the air cleaner.

FIG. 17 is a top view of the air cleaner 22 illustrated in FIG. 16 and a surrounding of the air cleaner 22. As illustrated in FIG. 17, the air cleaner 22 is covered by the side cowl 11 at the outer side of the air cleaner 22 in the vehicle width direction of the off-road vehicle 1 such that the air cleaner 22 and the side cowl 11 is next to each other. This configuration makes the air cleaner 22 more accessible for a user from outside in the width direction of the off-road vehicle 1 than when some other member is provided between the air cleaner 22 and the side cowl 11.

The hinge 66 of the air cleaner 22 is provided to be further away from the cutout portion 11*a* of the side cowl 11 than a center O of the air cleaner 22 is away from the cutout portion 11*a*. With this configuration, the lid 65 (see FIG. 16) is opened in a direction away from the cutout portion 11*a* of the side cowl 11, making the air cleaner element 62 easily replaceable through the cutout portion 11*a* of the side cowl 11. The lock 67 is provided to be closer to the cutout portion 11*a* than the center O of the air cleaner case 61 is to the cutout portion 11*a*. This configuration enables the user to easily open and close the lid 65 (see FIG. 16) through the cutout portion 11*a* of the side cowl 11.

Figure 18:
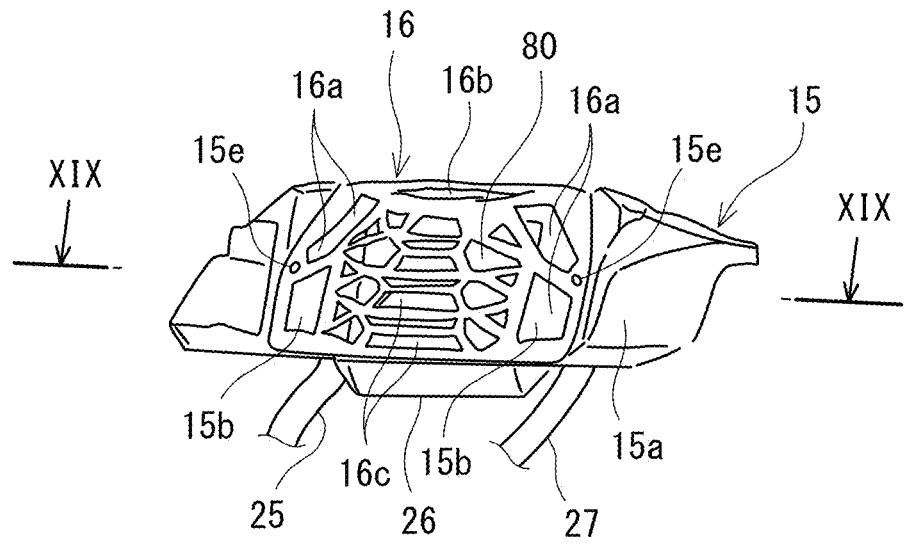
FIG. 18 is a diagonally left front view of an intercooler illustrated in FIG. 5 together with an engine room cover and a protection cover.
Figure 19:
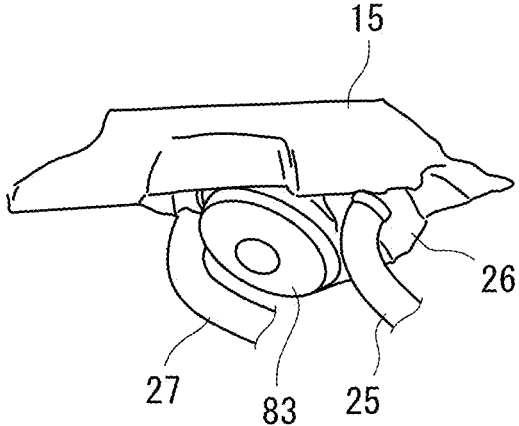
FIG. 19 is a diagonally right rear view of the intercooler and the engine room cover illustrated in FIG. 18.

FIG. 18 is a diagonally left front view of the intercooler 26 illustrated in FIG. 5 together with the engine room cover 15 and the protection cover 16. FIG. 19 is a diagonally right rear view of the intercooler 26 and the engine room cover 15 illustrated in FIG. 18. As illustrated in FIGS. 18 and 19, the engine room cover 15 defines an upper boundary of the engine room ER and partially covers the engine room ER, as described above by referring to FIG. 2. An upper surface 15*a* of the engine room cover 15 is exposed to outside the off-road vehicle 1. The upper surface 15*a* of the engine room cover 15 faces forward and upward. Specifically, a rear edge of the upper surface 15*a* of the engine room cover 15 is higher than a front edge of the upper surface 15*a* of the engine room cover 15.

The intercooler 26 includes a fan 83. The fan 83 is provided on a lower surface of the intercooler core 80. By driving the fan 83, air passes through the intercooler core 80 from the upper surface toward the lower surface of the intercooler core 80.

The engine room cover 15 is provided over the intercooler 26. The engine room cover 15 includes the window opening WD. Through the window opening WD, the intercooler core 80 is exposed to outside the off-road vehicle 1. The protection cover 16 is mounted on the engine room cover 15 to cover the window opening WD from above the window opening WD. The protection cover 16 has openings 16*a*. Each of the openings 16*a* is oriented in the width direction of the off-road vehicle 1. When ambient air flows into the space behind the cabin C (see FIG. 1) from the width direction of the off-road vehicle 1, the ambient air easily reaches the intercooler core 80 through the openings 16*a* of the protection cover 16.

The protection cover 16 has openings 16*a*, 16*b*, and 16*c*. The opening 16*b* is oriented rearward. The openings 16*c* and 16*a* are provided in front of the opening 16*b*. When air flows into the protection cover 16 and is subjected to heat exchange at the intercooler core 80, the resulting air is easily discharged outside through the rearward-oriented opening 16*b* of the protection cover 16. Thus, air is prevented from remaining in the protection cover 16, resulting in improved cooling performance of the intercooler 26. Specifically, the protection cover 16 is a mesh cover having a dome shape protruding upward. This configuration ensures that running air easily flows into the protection cover 16 and the air inside the protection cover 16 is easily discharged outside, resulting in improved cooling performance of the intercooler 26.

Figure 20:
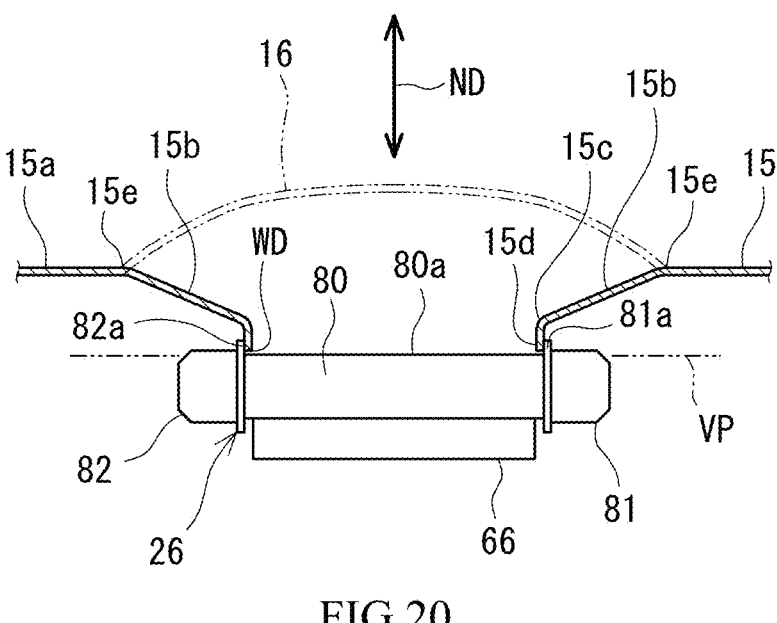
FIG. 20 is a cross-sectional view taken along a plane indicated by line XIX-XIX illustrated in FIG. 18.

FIG. 20 is a cross-sectional view taken along a plane indicated by line XIX-XIX illustrated in FIG. 18. As illustrated in FIG. 20, the engine room cover 15 includes a receiving portion 15*e*. The engine room cover 15 is provided at a distance from the window opening WD in the width direction of the off-road vehicle 1. The protection cover 16 is mounted on the receiving portion 15*e* of the engine room cover 15 using a securing tool. The openings 16*a* of the protection cover 16 are provided outside the intercooler core 80 in the width direction of the off-road vehicle 1. This configuration ensures that the air near the window opening WD of the engine room cover 15 in the width direction of the off-road vehicle 1 is easily guided to the intercooler core 80 without being blocked by the protection cover 16.

The window opening WD of the engine room cover 15 has a circumferential edge portion 15*c*. The circumferential edge portion 15*c* faces an upper surface of the intercooler 26 from above the upper surface, and is provided along an outer circumferential edge of the intercooler core 80. This configuration ensures that while the off-road vehicle 1 is running, air is guided along the upper surface 15*a* of the engine room cover 15 and is easily brought into contact with the entire intercooler core 80 through the window opening WD of the engine room cover 15.

The upper surface 15*a* of the engine room cover 15 has a pair of slope surfaces 15*b*. The pair of slope surfaces 15*b* are provided adjacent to the window opening WD at both sides of the window opening WD in the width direction of the off-road vehicle 1. The pair of slope surfaces 15*b* are inclined relative to a virtual plane VP. The virtual plane VP extends along an upper surface 80*a* of the intercooler core 80. Specifically, the pair of slope surfaces 15*b* become closer to the intercooler core 80 in a normal direction ND as the pair of slope surfaces 15*b* are provided more inward in the width direction of the off-road vehicle 1. The normal direction ND is perpendicular to the upper surface 80*a* of the intercooler core 80. When air flows along the upper surface 15*a* of the engine room cover 15 from the outside toward the inside in the width direction of the off-road vehicle 1, the air is easily brought into contact with the intercooler core 80 by being guided by the slope surfaces 15*b*. The receiving portion 15*e* of the engine room cover 15 is provided outward relative to the slope surfaces 15*b* in the width direction of the off-road vehicle 1. This configuration ensures that when running air passes inward through the protection cover 16, the air is easily brought into contact with the intercooler core 80 by being guided by the slope surfaces 15*b* of the engine room cover 15.

The engine room cover 15 covers the inlet tank 81 and the outlet tank 82 of the intercooler 26 from above the inlet tank 81 and the outlet tank 82. This configuration ensures that the flow of air along the upper surface 15*a* of the engine room cover 15 toward the intercooler core 80 is not disrupted by the inlet tank 81 and the outlet tank 82 of the intercooler 26.

The inlet tank 81 has an inner side surface 81*a*. The inner side surface 81*a* protrudes from one end of the upper surface 80*a* of the intercooler core 80 and extends in the normal direction ND. The normal direction ND is perpendicular to the upper surface 80*a* of the intercooler core 80. Similarly, the outlet tank 82 has an inner side surface 82*a*. The inner side surface 82*a* protrudes from the other end of the upper surface 80*a* of the intercooler core 80 and extends in the normal direction ND.

The circumferential edge portion 15*c* of the window opening WD of the engine room cover 15 has a protrusion 15*d*. The protrusion 15*d* protrudes toward the intercooler core 80 and extends along the inner side surfaces 81*a* and 82*a*. The protrusion 15*d* covers the inner side surface 81*a* of the inlet tank 81 and the inner side surface 82*a* of the outlet tank 82. This configuration ensures that when heat from the internal combustion engine EG reaches the gap between the engine room cover 15 and the inlet tank 81 and the outlet tank 82 of the intercooler 26, it is difficult for the heat to reach the intercooler core 80, preventing degradation of cooling performance of the intercooler 26.

Figure 21:
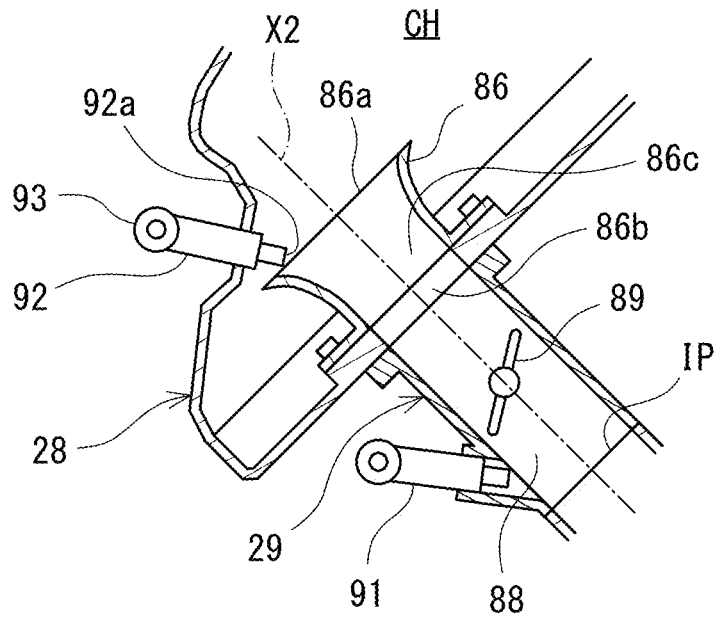
FIG. 21 is a longitudinal sectional view of an intake tank illustrated in FIG. 6 and a surrounding of the intake tank.
Figure 22:
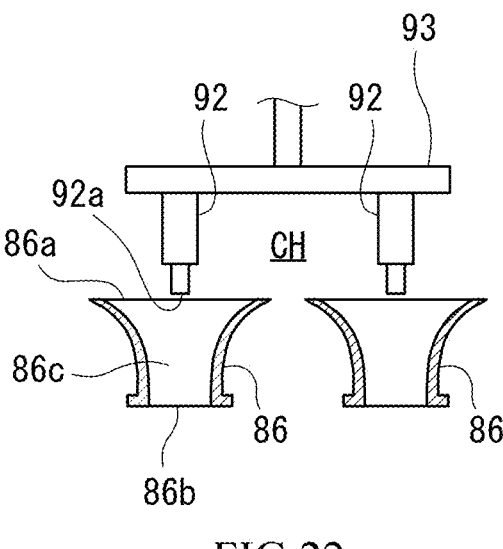
FIG. 22 is a top view and a partial cross-sectional view of air guides and second injectors provided in the intake tank illustrated in FIG. 6.

FIG. 21 is a longitudinal sectional view of the intake tank 28 illustrated in FIG. 6 and a surrounding of the intake tank 28. FIG. 22 is a top view and a partial cross-sectional view of air guides 86 and second injectors 92, which are provided in the intake tank 28 illustrated in FIG. 6. As illustrated in FIG. 21, the throttle body 29 is connected to the intake port IP of the internal combustion engine EG. The throttle body 29 includes a plurality of intake conduits 88 and a plurality of throttle valves 89. The plurality of intake conduits 88 is respectively connected to the intake ports IP of the plurality of cylinders of the internal combustion engine EG. The plurality of throttle valves 89 are each provided in each of the intake conduits 88. The throttle body 29 includes a plurality of first injectors 91. The plurality of first injectors 91 each inject fuel to a corresponding one of the plurality of intake conduits 88.

As illustrated in FIGS. 21 and 22, the intake tank 28 includes a plurality of air guides 86 in the intake chamber CH of the intake tank 28. Each air guide 86 guides the air in the intake chamber CH to the intake conduit 88 of the throttle body 29. The air guide 86 includes an intake port 86*a*, an exhaust port 86*b*, and a guide conduit 86*c*. The intake port 86*a* faces the intake chamber CH. The exhaust port 86*b* is connected to the intake conduit 88 of the throttle body 29. The exhaust port 86*b* of the air guide 86 also serves as an exhaust port of the intake tank 28. The guide conduit 86*c* connects the intake port 86*a* to the exhaust port 86*b*. The guide conduit 86*c* is tapered from narrow to wide toward the intake port 86*a*. With this configuration of the intake port 86*a*, the intake port 86*a* is larger than the exhaust port 86*b*.

The intake tank 28 includes a plurality of second injectors 92. The plurality of second injectors 92 inject fuel to the intake chamber CH. Each second injector 92 is supplied fuel through a delivery pipe 93. The second injector 92 is provided for a corresponding one of the air guides 86. The fuel injected from the second injector 92 is vaporized to promote reduction of temperature of the air guided into the internal combustion engine EG.

In this embodiment, the throttle body 29 is used instead of an intake manifold. The throttle body 29 includes the throttle valves 89 respectively in the plurality of intake conduits 88. Using such throttle body 29 ensures that interference between the air being absorbed into the cylinders of the internal combustion engine EG is less likely to occur. The fuel injected from each second injector 92 is accurately guided to the corresponding intake conduit 88 of the throttle body 29. Then, the fuel is vaporized to generate a suitable amount of heat of vaporization for the corresponding cylinder of the internal combustion engine EG. This configuration reduces variation in intake temperature among the cylinders, ensuring that a knocking prevention effect is stable in each cylinder.

Each second injector 92 has an injection hole 92*a*. The injection hole 92*a* faces the intake port 86*a* of the air guide 86. This configuration ensures that the fuel injected from the second injector 92 is stably guided by the air guide 86 to the intake conduit 88 of the throttle body 29. The second injector 92 is provided to be away from an axis X2 of the intake port 86*a* of the air guide 86 in a direction orthogonal to the axis X2. This configuration keeps a smooth flow of intake air toward the intake port 86*a* of the air guide 86 in the intake chamber CH. The second injector 92 is inclined relative to the axis X2, and the injection hole 92*a* faces the axis X2 and a downstream of the guide conduit 86*c* of the air guide 86. This configuration ensures that the fuel from the second injector 92 is appropriately dispersed to the intake air in the guide conduit 86*c* of the air guide 86.

Figure 23:
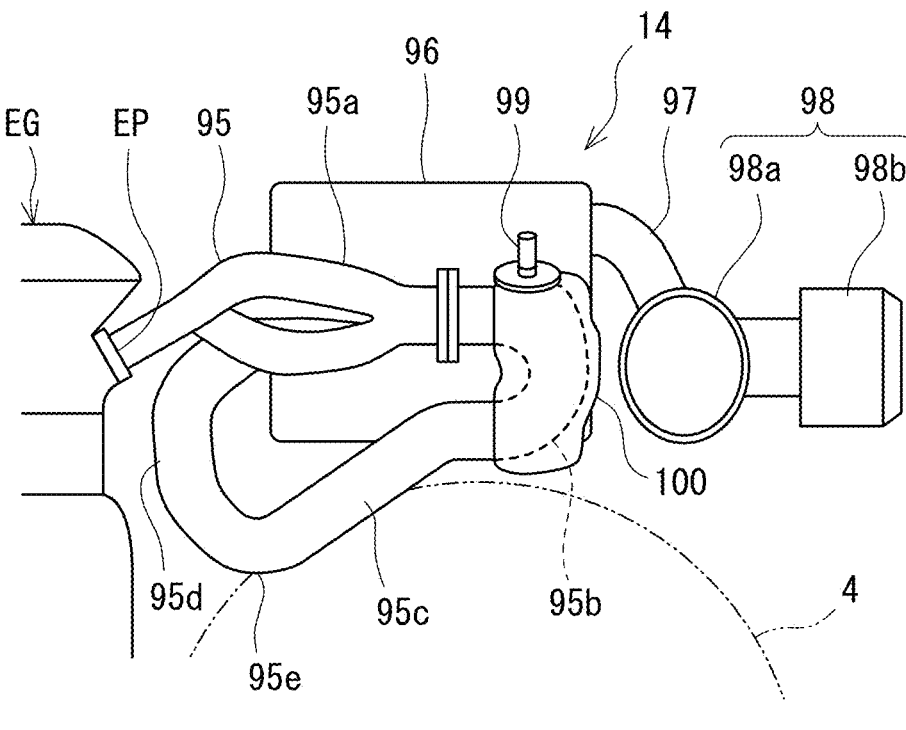
FIG. 23 is a left side view of the exhaust system of the off-road vehicle illustrated in FIG. 1.
Figure 24:
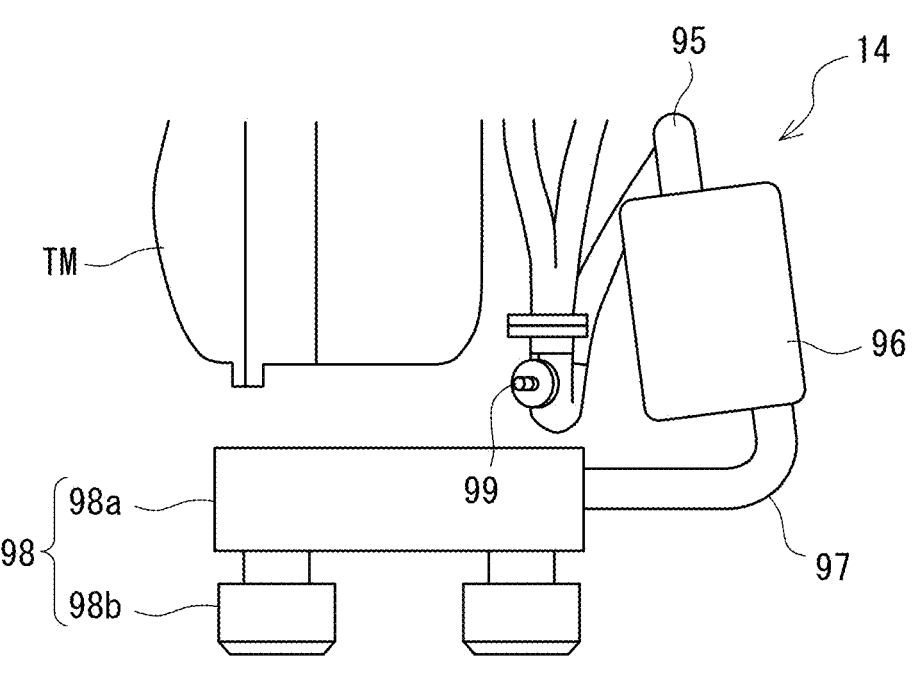
FIG. 24 is a top view of the exhaust system illustrated in FIG. 23.

FIG. 23 is a left side view of the exhaust system 14 of the off-road vehicle 1 illustrated in FIG. 1. FIG. 24 is a top view of the exhaust system 14 illustrated in FIG. 23. As illustrated in FIGS. 23 and 24, the exhaust system 14 includes the first exhaust pipe 95, the first muffler 96, the second exhaust pipe 97, and the second muffler 98. The first muffler 96 and the second muffler 98 are provided in a space under the cargo bed 10 (see FIG. 2). The first exhaust pipe 95 is connected to an exhaust port EP of the internal combustion engine EG. The first exhaust pipe 95 is curved in a vertical direction.

Specifically, the first exhaust pipe 95 includes a manifold 95*a*, a first curved portion 95*b*, a return portion 95*c*, and a second curved portion 95*d*. The manifold 95*a* has upstream end portions respectively connected to a plurality of exhaust ports EP of the internal combustion engine EG. The upstream end portions meet at a downstream end portion of the manifold 95*a*. The first curved portion 95*b* is curved in a U shape such that an upstream end portion and a downstream end portion of the first curved portion 95*b* are oriented in a front direction of the off-road vehicle 1 in a side view of the off-road vehicle 1. The first curved portion 95*b* is curved downward from the upstream side toward the downstream side. The upstream end portion of the first curved portion 95*b* is connected to the manifold 95*a*, and the downstream end portion of the first curved portion 95*b* is connected to the return portion 95*c*. The return portion 95*c* extends in the front direction of the off-road vehicle 1. The second curved portion 95*d* is curved in a U shape such that an upstream end portion and a downstream end portion are oriented in the front direction of the off-road vehicle 1 in a side view of the off-road vehicle 1. The second curved portion 95*d* is curved upward from the upstream side toward the downstream side. The upstream end portion of the second curved portion 95*d* is connected to the return portion 95*c*, and the downstream end portion of the second curved portion 95*d* is connected to an inlet of the first muffler 96.

The exhaust gas discharged through the exhaust port EP of the internal combustion engine EG takes a steep turn at the first curved portion 95*b* of the first exhaust pipe 95, making the first curved portion 95*b* likely to increase in temperature. In view of this, the first curved portion 95*b* is covered by a tube cover 100. An example of the tube cover 100 is a metal plate. A space is defined between an inner surface of the tube cover 100 and an outer surface of the first exhaust pipe 95. This configuration reduces the amount of heat transmitted from the first curved portion 95*b* of the first exhaust pipe 95 to its surroundings.

The first muffler 96 is connected to the first exhaust pipe 95 and the second exhaust pipe 97. The second muffler 98 is connected to the second exhaust pipe 97. With this configuration, the exhaust gas discharged through the exhaust port EP of the internal combustion engine EG flows through the first exhaust pipe 95, the first muffler 96, the second exhaust pipe 97, and the second muffler 98, in this order. Then, the exhaust gas is discharged outside the off-road vehicle 1 from the second muffler 98. Thus, exhaust noise is reduced stepwise by the first muffler 96 and the second muffler 98. Specifically, exhaust noise is attenuated appropriately to comply with noise regulations.

The first muffler 96 and the second muffler 98 are spaced apart from each other in the width direction of the off-road vehicle 1. The first muffler 96 is exposed outward in the width direction of the off-road vehicle 1 in a side view of the off-road vehicle 1. The second muffler 98 is provided behind the first muffler 96. The first muffler 96 extends in the front-rear direction of the off-road vehicle 1, and the second muffler 98 extends in the width direction of the off-road vehicle 1. This configuration increases the degree of freedom of component design and component layout in the space under the cargo bed 10 of the off-road vehicle 1. The above configuration also ensures that the first muffler 96 is cooled by air flowing in the front-rear direction of the off-road vehicle 1, preventing the heat of the first muffler 96 from being transmitted to the second muffler 98.

The first muffler 96 and the second muffler 98 are provided at positions higher than the rear wheels 4. This configuration ensures that the ground's muddy water splashing from the rear wheels 4 is less likely to hit the first muffler 96 and the second muffler 98. The first muffler 96 has a height range measured from an upper end to a lower end of the first muffler 96. Similarly, the second muffler 98 has a height range measured from an upper end to a lower end of the second muffler 98. These height ranges overlap. This configuration minimizes the height range occupied by the first muffler 96 and the second muffler 98 as a whole.

An oxygen sensor 99 is mounted on the first exhaust pipe 95. The oxygen sensor 99 includes a detection part exposed to a conduit of the first exhaust pipe 95 to detect oxygen concentration of the exhaust gas from the internal combustion engine EG. The oxygen sensor 99 is provided further upstream than a lowermost portion 95*e* of the first exhaust pipe 95. Specifically, the oxygen sensor 99 is mounted on an upper portion of the first curved portion 95*b* (the upper portion is an upstream portion of the first curved portion 95*b*), and protrudes upward from the first exhaust pipe 95. There may be a case where the lowermost portion 95*e* of the first exhaust pipe 95 touches water, causing the moisture included in the exhaust gas to be liquefied into water. In this case, the resulting water flows toward further downstream than the lowermost portion 95*e* of the first exhaust pipe 95, as if to be away from the oxygen sensor 99. This configuration ensures that when the moisture included in the exhaust gas is liquefied into water, the resulting water is prevented from attaching to the oxygen sensor 99. As a result, the oxygen sensor 99 is prevented from being shortened in lifetime.

The continuously variable transmission TM is provided to the left of the internal combustion engine EG. The first muffler 96 is provided to the right of the internal combustion engine EG. This configuration ensures that the heat passing through the passage defined by the first exhaust pipe 95, the first muffler 96, and the second exhaust pipe 97 is prevented from being transmitted to the continuously variable transmission TM. As a result, a lower level of heat resistance is required of the continuously variable transmission TM.

The first muffler 96 has a capacity larger than the capacity of the second muffler 98. The first muffler 96 is provided further upstream than the second muffler 98, and is larger in capacity than the second muffler 98. While such first muffler 96 tends to have high temperatures, the first muffler 96 is cooled by running air flowing on both sides of the off-road vehicle 1 while the off-road vehicle 1 is running. The second muffler 98 is provided further inward than the first muffler 96 in the width direction of the off-road vehicle 1. Since, however, the second muffler 98 has a smaller capacity, the second muffler 98 is prevented from having an excessively large heat influence on surrounding components.

The second muffler 98 is provided behind the first exhaust pipe 95 and the first muffler 96. The second muffler 98 includes a muffler body 98*a* and a pair of muffler nozzles 98*b*. The muffler body 98*a* is connected to the second exhaust pipe 97 and extends in the width direction of the off-road vehicle 1. The pair of muffler nozzles 98*b* protrude rearward from the muffler body 98*a*. The pair of muffler nozzles 98*b* are spaced apart from each other in the width direction of the off-road vehicle 1.

Figure 25:
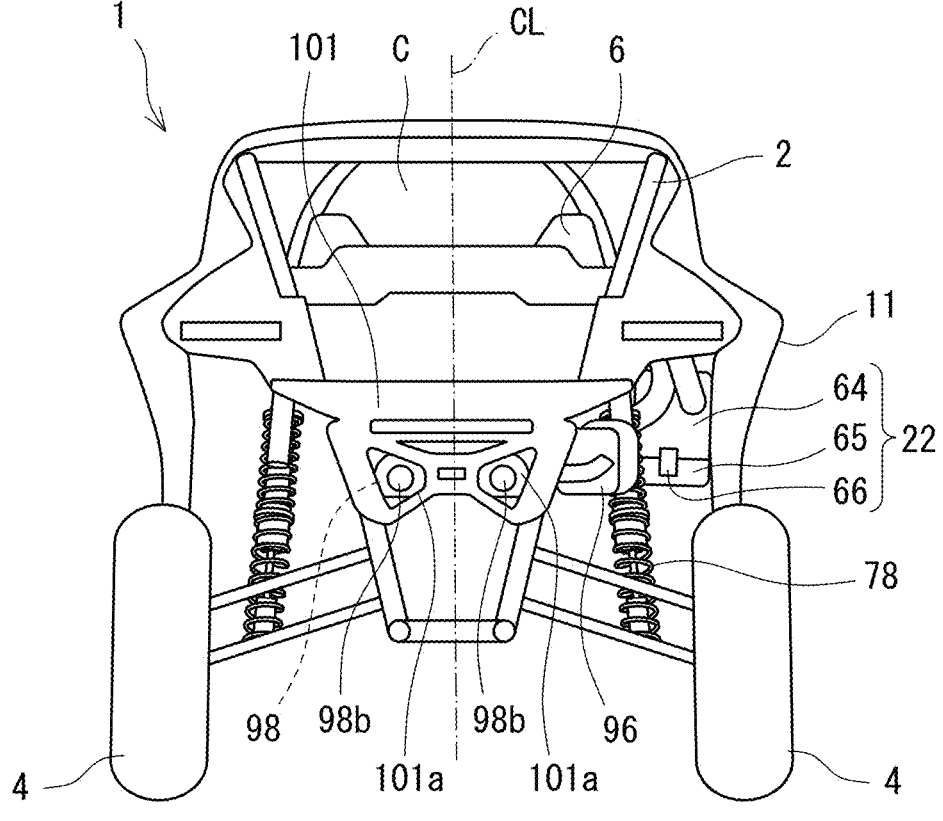
FIG. 25 is a rear side view of the off-road vehicle illustrated in FIG. 1.

FIG. 25 is a rear side view of the off-road vehicle 1 illustrated in FIG. 1. As illustrated in FIG. 25, the first muffler 96 and the second muffler 98 are exposed in the rear side view of the off-road vehicle 1. In particular, the second muffler 98 is provided behind the first muffler 96, and is exposed in the rear side view of the off-road vehicle 1. This configuration enables the second muffler 98 to smoothly discharge heat rearward while the off-road vehicle 1 is running. In other words, the first muffler 96 and the second muffler 98 are cooled in a well-balanced manner.

The muffler body 98*a* of the second muffler 98 is covered by a rear cowl 101 from behind the muffler body 98*a*. The rear cowl 101 has a pair of openings 101*a*. The pair of openings 101*a* are aligned in the width direction of the off-road vehicle 1. The muffler nozzles 98*b* are respectively provided at the openings 101*a* in the rear side view of the off-road vehicle 1. A phantom vehicle center line CL extends in the vertical direction. In the rear side view of the off-road vehicle 1, the phantom vehicle center line CL is provided between the pair of muffler nozzles 98b, which are aligned in the width direction of the off-road vehicle 1. The pair of muffler nozzles 98b are provided to be bilaterally symmetric with respect to the phantom vehicle center line CL. The pair of openings 101a of the rear cowl 101 are bilaterally symmetric with respect to the phantom vehicle center line CL. This configuration makes the off-road vehicle 1 pleasing in appearance in its rear side view. The lid 65 of the air cleaner 22 is also exposed in the rear side view of the off-road vehicle 1. This configuration makes the lid 65 of the air cleaner 22 more accessible.

Figure 26:
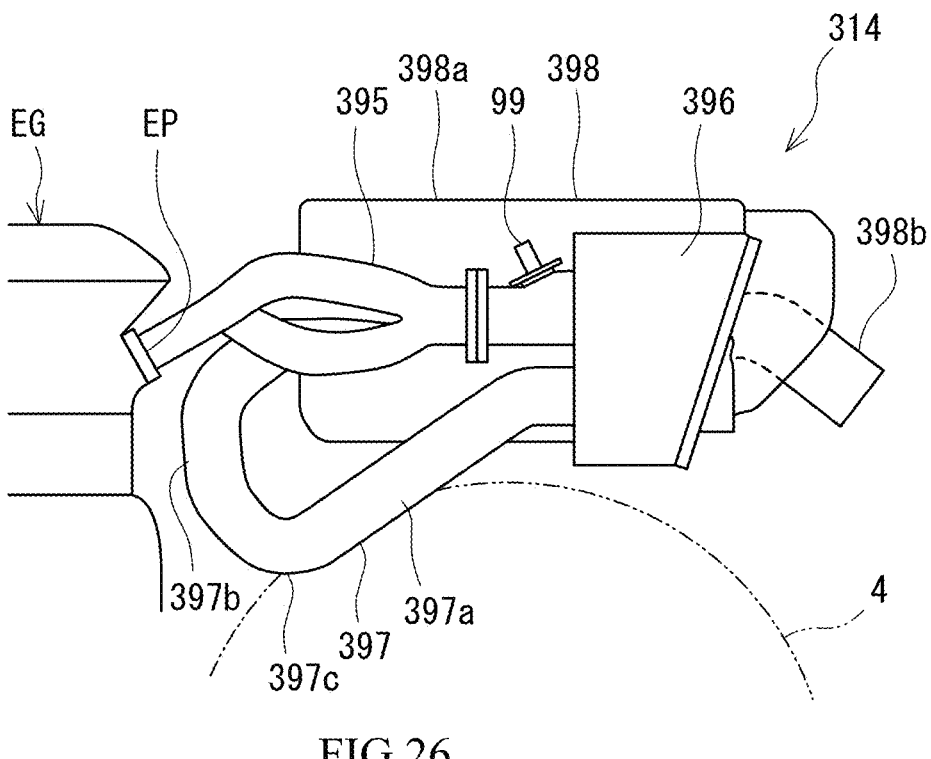
FIG. 26 is a left side view of a modification of the exhaust system illustrated in FIG. 23.
Figure 27:
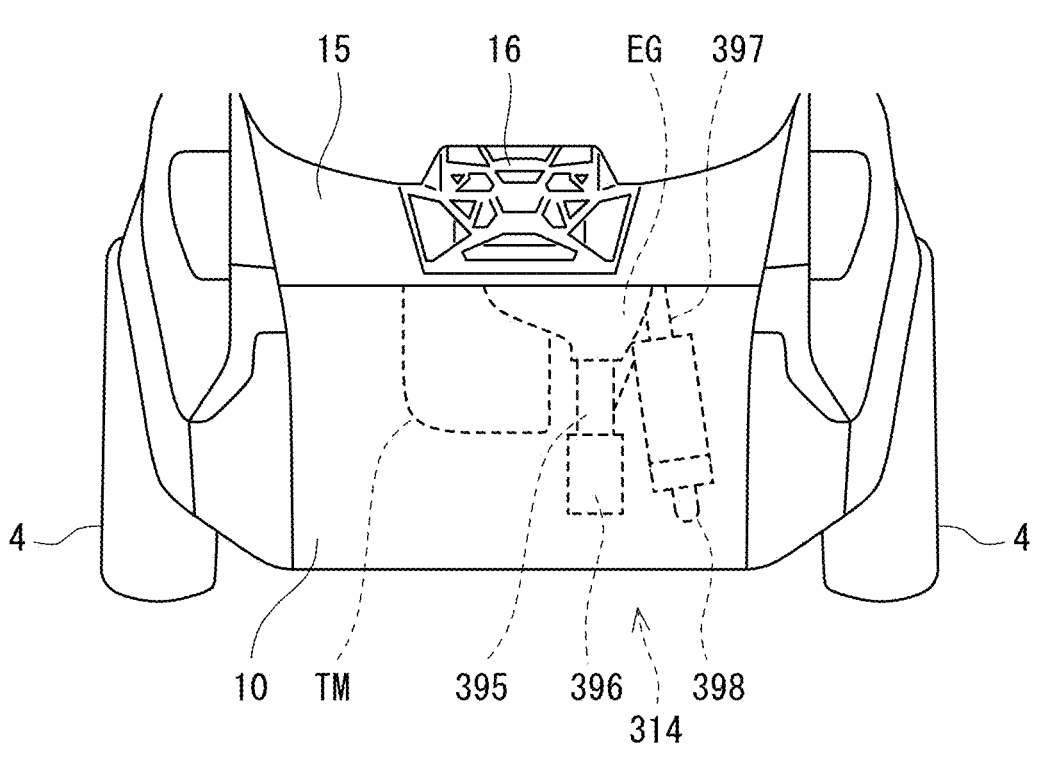
FIG. 27 is a top view of the rear portion of the off-road vehicle including the exhaust system illustrated in FIG. 26.

FIG. 26 is a left side view of a modification of the exhaust system 14 illustrated in FIG. 23. FIG. 27 is a top view of the rear portion of the off-road vehicle 1 including an exhaust system 314 illustrated in FIG. 23. As illustrated in FIGS. 26 and 26, the exhaust system 314 according to this modification includes a first exhaust pipe 395, a first muffler 396, a second exhaust pipe 397, and a second muffler 398. The first muffler 396 and the second muffler 398 are provided in the space under the cargo bed 10. The first exhaust pipe 395 is connected to the exhaust port EP of the internal combustion engine EG. The first exhaust pipe 395 is curved in the vertical direction.

Specifically, the first exhaust pipe 395 has upstream end portions respectively connected to the plurality of exhaust ports EP of the internal combustion engine EG. The upstream end portions meet at a downstream end portion of the first exhaust pipe 395. The first exhaust pipe 395 is connected to the first muffler 396. The first muffler 396 extends in the vertical direction. The first exhaust pipe 395 is connected to an upper portion of the front side of the first muffler 396. The second exhaust pipe 397 extends frontward from a lower portion of the first muffler 396. A front portion of the second exhaust pipe 397 is curved upward from the upstream side toward the downstream side. The second exhaust pipe 397 is connected to the second muffler 398. The second muffler 398 includes a muffler body 398a and a muffler nozzle 398b. To the muffler body 398a, the second exhaust pipe 397 is connected. The muffler nozzle 398b protrudes rearward from the muffler body 398a.

The second muffler 398 has a capacity larger than the capacity of the first muffler 396. The second muffler 398 is provided further outward than the first muffler 396 in the width direction of the off-road vehicle 1. The second muffler 398 is exposed outward in the width direction of the off-road vehicle 1. The first muffler 396 and the second muffler 398 are provided at positions higher than the rear wheels 4. The first muffler 396 and the second muffler 398 overlap in a side view of the off-road vehicle 1. That is, the height range of the first muffler 396 from its upper end to lower end overlaps with the height range of the second muffler 398 from its upper end to lower end.

The oxygen sensor 99 is mounted on the first exhaust pipe 395. The oxygen sensor 99 is provided further upstream than a lowermost portion 397c of the second exhaust pipe 397, that is, the lowermost portion 397c of the exhaust system 314. Specifically, the oxygen sensor 99 is mounted on an upper portion of the first exhaust pipe 395 and protrudes upward from the first exhaust pipe 395.

It will be appreciated that the present disclosure will not be limited to the above-described embodiment. For example, the introduction duct 35 of the intake box 20 may not necessarily be a piece separate from the intake box 20; the bottom wall 30 of the intake box 20 and the introduction duct 35 may be a one-piece element. The openings 38 and 42 of the mesh walls 31 and 32 of the intake box 20 may not necessarily be hexagonal in shape but may be round in shape, for example.

The intake box 20 and the air cleaner 22 may be used for the intake air guided to the inside of the continuously variable transmission TM for cooling purposes. In the air cleaner 22, the lid 65 may not necessarily be connected to the case body 64 by the hinge 66. That is, the lid 65 may be completely removable from the case body 64. The lid 65 of the air cleaner 22 may have drain holes through which water is discharged. The opening 70 of the case body 64 of the air cleaner 22 may be arranged to expose the internal space 63 substantially in the horizontal direction. The lid 65 of the air cleaner 22 may close the opening 70 of the case body 64 substantially in the horizontal direction. The opening 70 of the case body 64 may be shaped and sized to permit the air cleaner element 62 moving in the horizontal direction to pass through the opening 70. In this case as well, the lid 65 of the air cleaner 22 may be visually recognizably provided between the side cowl 11 and the rear suspension 78 such that the lid 65 is exposed in a diagonal rear view of the off-road vehicle 1.

The air cleaner 22 may be covered by a cowl other than the side cowl 11. The supercharger 24 may be an electric supercharger driven by an electric motor. The supercharger 24, however, will not be limited to a mechanical supercharger but may be a turbocharger driven by an exhaust turbine. The off-road vehicle 1 may not necessarily be equipped with the supercharger 24. In this case, the intake supplied element connected to the second intake duct 23 may be the intake tank 28 or the internal combustion engine EG. While the plurality of air guides 86 are structures separate from each other, the plurality of air guides 86 may be an integrally molded one-piece element.

While the present disclosure has been described in connection with embodiments, it will be understood that the above-described embodiments will not be intended in a limiting sense and that omissions, substitutions, additions, and/or alterations may be made to the embodiments. It will also be understood that the components and/or configurations described in the embodiments may be combined to form a new embodiment. For example, one or some of the configurations described in the embodiments may be isolated from the rest of the configurations in any manner deemed suitable. It will further be understood that the components and/or configurations described in the accompanying drawings and detailed description not only include those components and/or configurations essential for problem solving purposes but also include those components and/or configurations inessential for problem solving purposes.

What is claimed is:

1. An off-road vehicle comprising:
   an intake duct defining a clean conduit; and
   an air cleaner connected to the intake duct, the air cleaner comprising:
   an air cleaner case defining an internal space of the air cleaner; and
   an air cleaner element contained in the air cleaner case and dividing the internal space into a dirty region and a clean region, the air cleaner element comprising a filter,
   the air cleaner case comprising:
   an intake port facing the dirty region;
   an exhaust port facing the clean region and communicating with the clean conduit of the intake duct, the exhaust port having an exhaust direction oriented upward relative to a horizontal direction;

a case body comprising the exhaust port and an opening through which the internal space is exposed downward;

a lid attached to the case body in a manner in which the opening of the case body is openable and closable by the lid from below the opening; and a hinge pivotally connecting the lid to the case body.

2. The off-road vehicle according to claim 1, wherein:

as viewed from the horizontal direction, the exhaust direction of the exhaust port is oriented substantially upward and has an angle within a range of less than 45 degrees relative to a vertical line.

3. The off-road vehicle according to claim 1, wherein;

the air cleaner case is oriented such that the exhaust port is visually recognizable when the air cleaner element is removed from the air cleaner case and the air cleaner case is viewed from vertically below the air cleaner case.

4. The off-road vehicle according to claim 1, wherein;

the air cleaner case further comprises a first cylinder protruding toward the internal space and having a protrusion end defining the exhaust port, and the air cleaner element has a bottomed cylinder shape fitted with the first cylinder in a direction parallel to a protrusion direction of the first cylinder, the protrusion direction being parallel to the exhaust direction of the exhaust port.

5. The off-road vehicle according to claim 1, wherein;

the opening of the case body is shaped and sized to permit the air cleaner element to pass through the opening.

6. The off-road vehicle according to claim 1, further comprising:

a cowl exposed outward in a width direction of the off-road vehicle and covering the air cleaner, the cowl having a cutout portion through which the air cleaner is exposed to outside the off-road vehicle, wherein the hinge is further away from the cutout portion than a center of the air cleaner is away from the cutout portion.

7. The off-road vehicle according to claim 6, wherein;

the air cleaner case further comprises a lock configured to lock the lid to the case body, the lock being closer to the cutout portion than the center of the air cleaner is to the cutout portion.

8. The off-road vehicle according to claim 1, wherein;

the air cleaner case has a tubular shape having an axis extending in the exhaust direction of the exhaust port, the case body comprises an element support extending in an axis direction in which the axis extends, and the air cleaner element is supported by the element support by being fitted with the element support.

9. The off-road vehicle according to claim 8, wherein:

the air cleaner case has a round cylinder shape, the element support is at an upper portion of the case body, and the air cleaner element supported by the element support is radially inward in the case body relative to an inner circumferential surface of the case body so that there is a space between the air cleaner element and the inner circumferential surface of the case body.

10. The off-road vehicle according to claim 1, wherein:

the exhaust port is at an upper end portion of the air cleaner case.

11. The off-road vehicle according to claim 1, wherein;

the air cleaner case has a tubular shape having an axis, and the axis of the air cleaner case is oriented substantially upward and has an angle within a range of less than 45 degrees relative to a vertical line as viewed from the horizontal direction.

12. The off-road vehicle according to claim 1, wherein:

the case body has a cone shape having an inner diameter increasing in a downward direction of the case body.

13. The off-road vehicle according to claim 1, further comprising:

a side cowl exposed outward in a width direction of the off-road vehicle, wherein the air cleaner is covered by the side cowl at an outer side of the air cleaner in the width direction of the off-road vehicle such that the air cleaner and the side cowl are next to each other.

14. The off-road vehicle according to claim 1, wherein:

the air cleaner is hidden in a side view of the off-road vehicle, and the lid of the air cleaner is exposed in a rear view of the off-road vehicle.

15. The off-road vehicle according to claim 1, wherein;

the air cleaner is hidden in a side view of the off-road vehicle, and the lid of the air cleaner is exposed in a diagonal rear view of the off-road vehicle.

16. The off-road vehicle according to claim 1, further comprising:

an intake supplied element below the air cleaner and connected to the clean conduit, wherein the clean conduit comprises a first portion protruding upward from the air cleaner, a second portion curved downward from the first portion, and a third portion extending from the second portion toward the intake supplied element.

17. The off-road vehicle according to claim 16, wherein:

the second portion has an inverse U-shape.

18. The off-road vehicle according to claim 1, wherein:

the case body comprises a circumferential wall, and the intake port is at the circumferential wall.

19. The off-road vehicle according to claim 18, wherein:

the exhaust port is provided above the intake port.

20. An off-road vehicle comprising:

an intake duct defining a clean conduit; and an air cleaner connected to the intake duct, the air cleaner comprising:

an air cleaner case defining an internal space of the air cleaner; and an air cleaner element contained in the air cleaner case and dividing the internal space into a dirty region and a clean region, the air cleaner element comprising a filter, the air cleaner case comprising:

an intake port facing the dirty region;

an exhaust port facing the clean region and communicating with the clean conduit of the intake duct;

a case body comprising the exhaust port and an opening through which the internal space is exposed, the opening being shaped and sized to permit the air cleaner element to pass through the opening;

a lid to close the opening of the case body; and a hinge pivotally connecting the lid to the case body.

\* \* \* \* \*